United States Patent
Inaba et al.

(10) Patent No.: US 10,761,109 B2
(45) Date of Patent: Sep. 1, 2020

(54) PHYSICAL QUANTITY SENSOR, INERTIA MEASUREMENT DEVICE, VEHICLE POSITIONING DEVICE, PORTABLE ELECTRONIC APPARATUS, ELECTRONIC APPARATUS, AND VEHICLE

(71) Applicant: Seiko Epson Corporation, Tokyo (JP)

(72) Inventors: Shogo Inaba, Shiojiri (JP); Atsuki Naruse, Shiojiri (JP); Shigekazu Takagi, Shiojiri (JP); Tomokazu Umeno, Shiojiri (JP); Satoru Tanaka, Chino (JP)

(73) Assignee: Seiko Epson Corporation (JP)

( * ) Notice: Subject to any disclaimer, the term of this patent is extended or adjusted under 35 U.S.C. 154(b) by 78 days.

(21) Appl. No.: 16/143,566

(22) Filed: Sep. 27, 2018

(65) Prior Publication Data
US 2019/0101566 A1   Apr. 4, 2019

(30) Foreign Application Priority Data
Sep. 29, 2017 (JP) ................. 2017-190489

(51) Int. Cl.
| | |
|---|---|
| *G01C 19/5628* | (2012.01) |
| *G01P 15/125* | (2006.01) |
| *G01P 15/08* | (2006.01) |
| *G01P 15/13* | (2006.01) |
| *G01C 19/56* | (2012.01) |

(52) U.S. Cl.
CPC ............ *G01P 15/125* (2013.01); *G01C 19/56* (2013.01); *G01P 15/0802* (2013.01); *G01P 15/131* (2013.01)

(58) Field of Classification Search
CPC .. G01P 15/125; G01P 15/131; G01P 15/0802; G01C 19/5628; G01C 19/56; G01L 19/003; G01L 19/147; Y10T 29/49103; Y10T 29/49774; Y10T 29/49927; Y10T 29/49918
See application file for complete search history.

(56) References Cited

U.S. PATENT DOCUMENTS

| | | | |
|---|---|---|---|
| 6,388,300 B1 | 5/2002 | Kano et al. | |
| 2005/0109109 A1 | 5/2005 | Eskridge et al. | |
| 2006/0048572 A1* | 3/2006 | Isogai | G01N 27/223 73/335.04 |
| 2015/0059475 A1* | 3/2015 | Takagi | G01P 15/125 73/514.32 |
| 2017/0012602 A1* | 1/2017 | Kanazawa | G01C 19/5607 |

FOREIGN PATENT DOCUMENTS

| | | |
|---|---|---|
| JP | 2000-286430 A | 10/2000 |
| JP | 2008-175825 A | 7/2008 |
| JP | 2015-052456 A | 3/2015 |

* cited by examiner

*Primary Examiner* — Brandi N Hopkins
(74) *Attorney, Agent, or Firm* — Harness, Dickey & Pierce, P.L.C.

(57) ABSTRACT

A physical quantity sensor includes a substrate, an element portion disposed so as to overlap the substrate, a conductor pattern disposed on the substrate so as to face the element portion, and a protection film covering at least a part of an exposed portion of the conductor pattern exposed from element portion in a plan view from a direction in which the substrate and the element portion overlap.

20 Claims, 30 Drawing Sheets

PHYSICAL QUANTITY SENSOR, INERTIA MEASUREMENT DEVICE, VEHICLE POSITIONING DEVICE, PORTABLE ELECTRONIC APPARATUS, ELECTRONIC APPARATUS, AND VEHICLE

CROSS-REFERENCE TO RELATED APPLICATION

This nonprovisional application claims the benefit of Japanese Patent Application No. 2017-190489 filed Sep. 29, 2017, the entire disclosure of which is incorporated herein by reference.

BACKGROUND

1. Technical Field

The present invention relates to a physical quantity sensor, an inertia measurement device, a vehicle positioning device, a portable electronic apparatus, an electronic apparatus, and a vehicle.

2. Related Art

In JP-A-2000-286430, an acceleration sensor which includes a substrate, a fixed comb-teeth electrode fixed to the substrate, and a movable comb-teeth electrode which is displaceable with respect to the substrate and is disposed to face a fixed electrode finger, and measures acceleration based on a change in electrostatic capacitance between the fixed comb-teeth electrode and the movable comb-teeth electrode, is described. The fixed comb-teeth electrode and the movable comb-teeth electrode can be formed, for example, by patterning a silicon substrate bonded to the substrate by dry etching.

In US Patent Application Publication No. 2005/0109109, an acceleration sensor which includes a substrate, a movable electrode which is swingable in a see-saw fashion with respect to the substrate, and a fixed electrode which is provided on the substrate and is disposed to face the movable electrode, and measures acceleration based on a change in electrostatic capacitance between the movable electrode and the fixed electrode, is described. A plurality of through-holes are formed in the movable electrode, and air resistance when the movable electrode swings in a see-saw fashion is reduced. The movable electrode can be formed, for example, by patterning a silicon substrate bonded to the substrate by dry etching.

However, in a case where an electrode and a wiring disposed on the substrate overlap a space between the fixed comb-teeth electrode and the movable comb-teeth electrode in a plan view in the acceleration sensor as described in JP-A-2000-286430 or in a case where the electrodes and wirings disposed on the substrate overlap the periphery of the movable electrode or a through-hole of the movable electrode in a plan view in the acceleration sensor as described in US Patent Application Publication No. 2005/0109109, there is a problem that electrodes and wirings are damaged during the dry etching described above and cause characteristic deterioration.

SUMMARY

An advantage of some aspects of the invention is to provide a physical quantity sensor of which a conductor pattern (electrode, wiring, and the like) disposed on a substrate is hardly damaged and in which characteristic deterioration hardly occurs, an inertia measurement device, a vehicle positioning device, a portable electronic apparatus, an electronic apparatus, and a vehicle.

The advantage can be achieved by the following configurations.

A physical quantity sensor according to an aspect of the invention includes a substrate, an element portion disposed so as to overlap the substrate, a conductor pattern disposed on the substrate so as to face the element portion, and a protection film covering at least a part of an exposed portion of the conductor pattern exposed from the element portion in a plan view from a direction in which the substrate and the element portion overlap.

With this configuration, it becomes a physical quantity sensor of which a conductor pattern (electrode, wiring, and the like) disposed on a substrate is hardly damaged and in which characteristic deterioration hardly occurs.

In the physical quantity sensor according to the aspect of the invention, it is preferable that the element portion includes a movable portion including a first mass portion and a second mass portion, a fixed portion attached to the substrate, and a beam connecting the movable portion and the fixed portion with each other, and the conductor pattern includes a first fixed electrode disposed to face the first mass portion and a second fixed electrode disposed to face the second mass portion.

With this configuration, it becomes a physical quantity sensor capable of measuring acceleration in a direction in which the substrate and the element portion overlap each other.

In the physical quantity sensor according to the aspect of the invention, it is preferable that a through-hole is formed in the movable portion.

With this configuration, air resistance when the movable portion is displaced is reduced, and detection sensitivity of the physical quantity is improved.

In the physical quantity sensor according to the aspect of the invention, it is preferable that at least a part of a portion of the first fixed electrode facing the first mass portion is exposed from the protection film, and at least a part of a portion of the second fixed electrode facing the second mass portion is exposed from the protection film.

With this configuration, it is possible to suppress variation in electrostatic capacitance between the first fixed electrode and the first mass portion and variation in electrostatic capacitance between the second fixed electrode and the second mass portion.

In the physical quantity sensor according to the aspect of the invention, it is preferable that the conductor pattern includes a wiring and a thickness of the protection film provided on the wiring is thicker than a thickness of the protection film disposed on each of the first fixed electrode and the second fixed electrode.

With this configuration, it is possible to suppress variation in electrostatic capacitance between the first fixed electrode and the first mass portion and variation in electrostatic capacitance between the second fixed electrode and the second mass portion and make the wiring less susceptible to damage.

In the physical quantity sensor according to the aspect of the invention, it is preferable that the element portion includes a fixed electrode finger fixed to the substrate and a movable electrode finger which is displaceable with respect to the substrate and is disposed to face the fixed electrode finger with a gap interposed therebetween, and the conductor pattern includes a first wiring electrically connected to the fixed electrode finger and a second wiring electrically connected to the movable electrode finger.

With this configuration, it becomes a physical quantity sensor capable of measuring acceleration in the direction in which the fixed electrode finger and the movable electrode finger face each other.

In the physical quantity sensor according to the aspect of the invention, it is preferable that the conductor pattern includes a first portion and a second portion that are arranged side by side, at least one of the first portion and the second portion includes the exposed portion at an outer edge portion on a side of the other of the first portion and the second portion, a distance between the first portion and the second portion is 50 μm or less, and at least a part of the exposed portion is covered with the protection film.

With this configuration, it is possible to effectively suppress a short circuit between the first portion and the second portion.

In the physical quantity sensor according to the aspect of the invention, it is preferable that the conductor pattern includes a first portion and a second portion that are arranged side by side, at least one of the first portion and the second portion includes the exposed portion at an outer edge portion on a side of the other of the first portion and the second portion, the distance between the first portion and the second portion is greater than 50 μm, and at least a part of the exposed portion is covered with the protection film.

With this configuration, it is possible to reduce the volume of the protection film, and to reduce an influence (for example, variation of the electrostatic capacitance between the first fixed electrode and the first mass portion and variation of the capacitance between the second fixed electrode and the second mass portion) of charging of the protection film to a small extent.

In the physical quantity sensor according to the aspect of the invention, it is preferable that the protection film contains silicon oxide as a constituent material.

With this configuration, a configuration of the protection film is simplified.

In the physical quantity sensor according to the aspect of the invention, it is preferable that the protection film is constituted by a laminated body formed by laminating a plurality of layers.

This configuration makes it easy for the protection film to have various functions (for example, function of protecting the conductor pattern and function of adhering to the substrate and the wiring).

An inertia measurement device according to another aspect of the invention includes the physical quantity sensor according to the aspect of the invention and a control circuit which controls driving of the physical quantity sensor or a processing circuit that processes an output signal of the physical quantity sensor.

With this configuration, it is possible to obtain the effect of the physical quantity sensor and to obtain an inertia measurement device with high reliability.

A vehicle positioning device according to another aspect of the invention includes the inertia measurement device according to the aspect of the invention, a reception unit that receives a satellite signal on which position information is superimposed from a positioning satellite, an acquisition unit that acquires position information of the reception unit based on the received satellite signal, a computation unit that computes an attitude of the vehicle based on inertia data output from the inertia measurement device, and a calculation unit that calculates a position of the vehicle by correcting the position information based on the calculated attitude.

With this configuration, it is possible to obtain the effect of the inertia measurement device and to obtain a vehicle positioning device with high reliability.

A portable electronic apparatus according to another aspect of the invention includes the physical quantity sensor according to the aspect of the invention, a case that accommodates the physical quantity sensor, a processing unit that is accommodated in the case and processes output data from the physical quantity sensor, a display that is accommodated in the case, and a translucent cover that covers an opening of the case.

With this configuration, it is possible to obtain the effect of the physical quantity sensor and to obtain a portable electronic apparatus with high reliability.

An electronic apparatus according to another aspect of the invention includes the physical quantity sensor according to the aspect of the invention and a control unit that performs control based on a detection signal output from the physical quantity sensor.

With this configuration, it is possible to obtain the effect of the physical quantity sensor and to obtain an electronic apparatus with high reliability.

A vehicle according to another aspect of the invention includes the physical quantity sensor according to the aspect of the invention and a control unit that performs control based on a detection signal output from the physical quantity sensor.

With this configuration, it is possible to obtain the effect of the physical quantity sensor and to obtain a vehicle with high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a physical quantity sensor, an inertia measurement device, a vehicle positioning device, a portable electronic apparatus, an electronic apparatus, and a vehicle according to the invention will be described in detail based on the embodiments illustrated in the accompanying drawings.

First Embodiment

Figure 1:
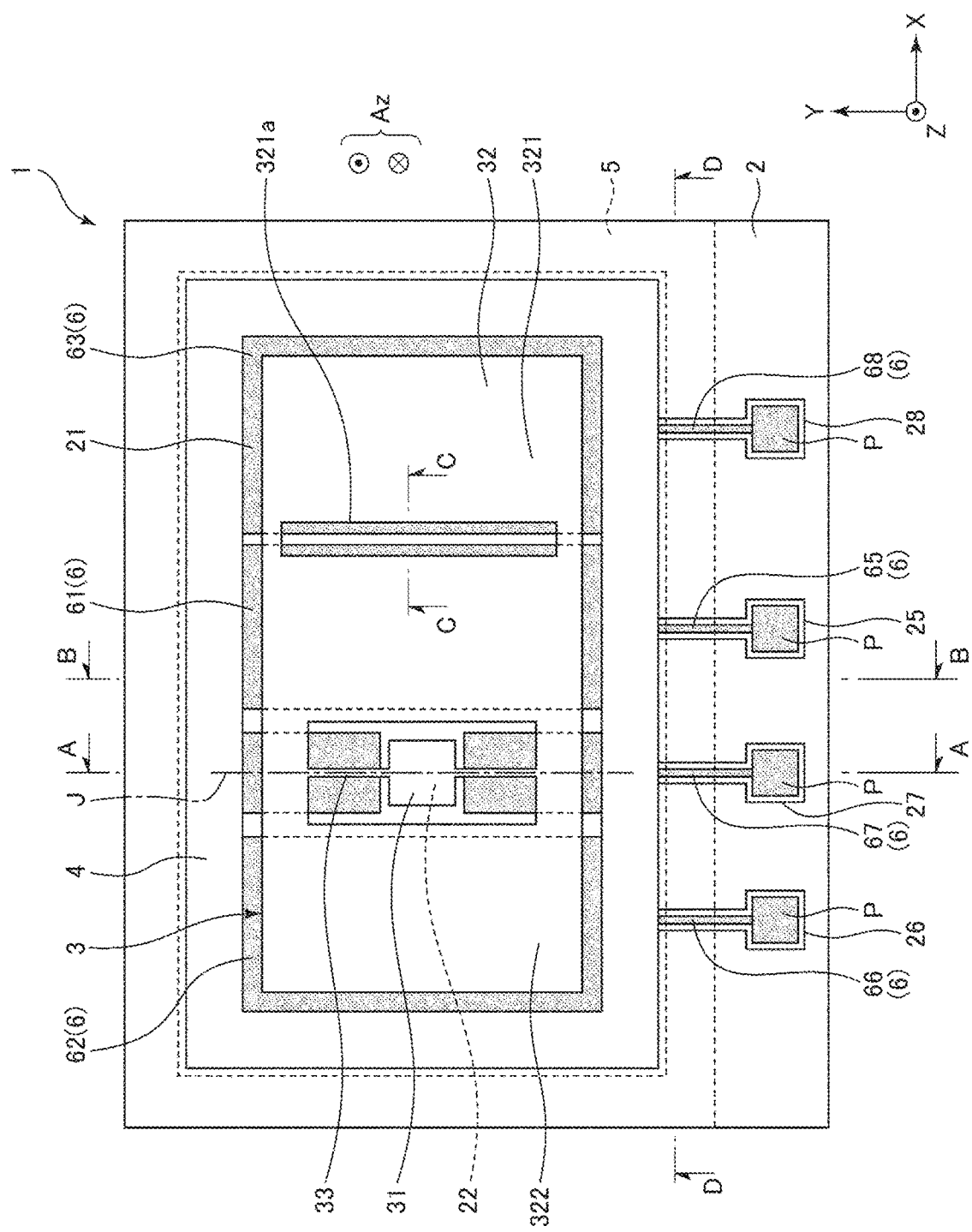
FIG. 1 is a plan view illustrating a physical quantity sensor according to a first embodiment.
Figure 2:
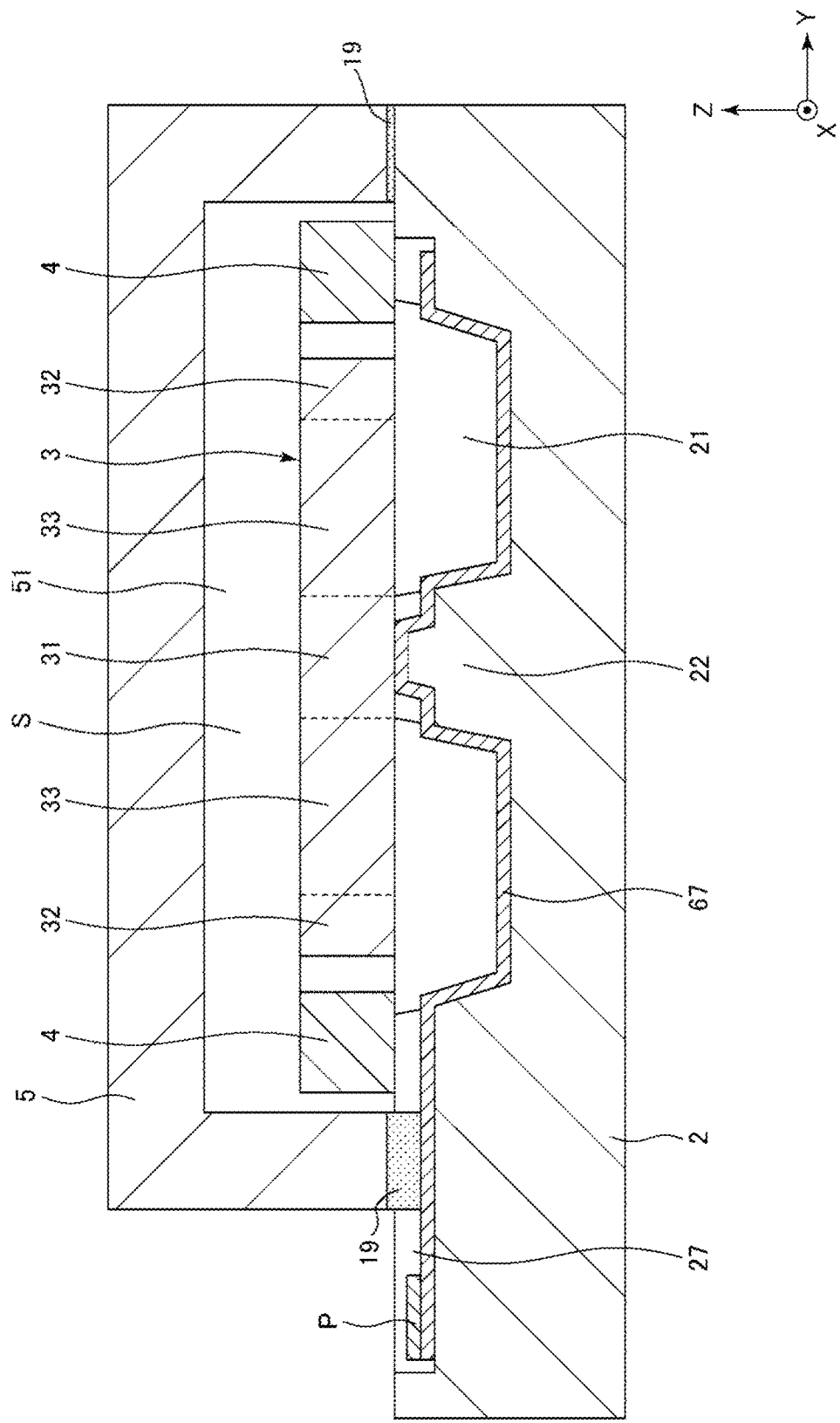
FIG. 2 is a cross-sectional view taken along line A-A in FIG. 1.
Figure 3:
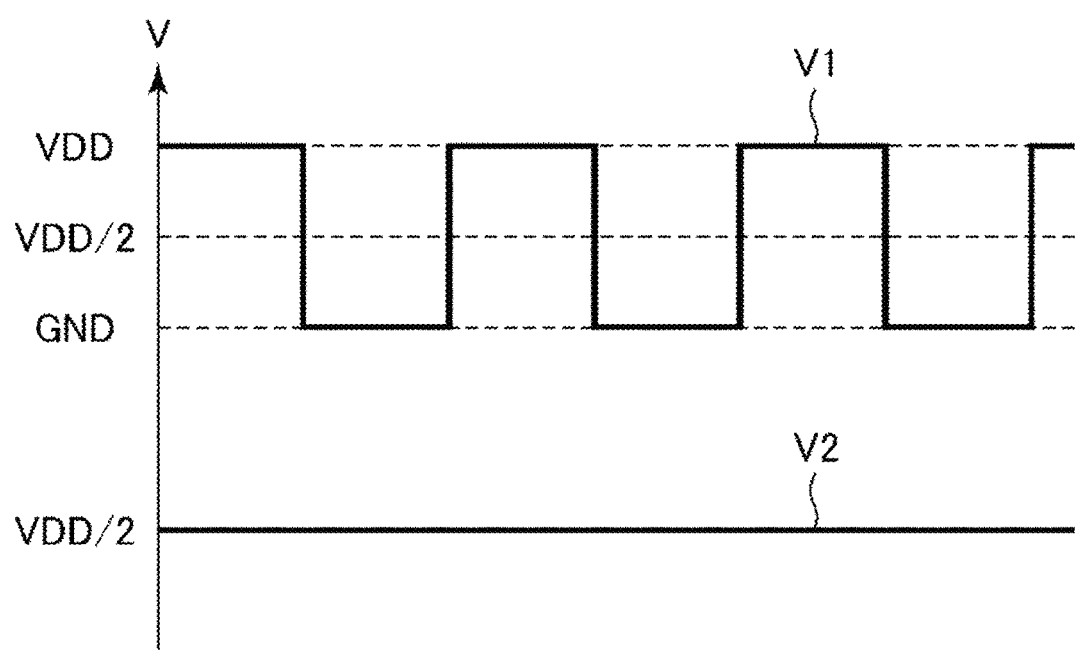
FIG. 3 is a diagram illustrating a voltage pattern to be applied to the physical quantity sensor illustrated in FIG. 1.
Figure 4:
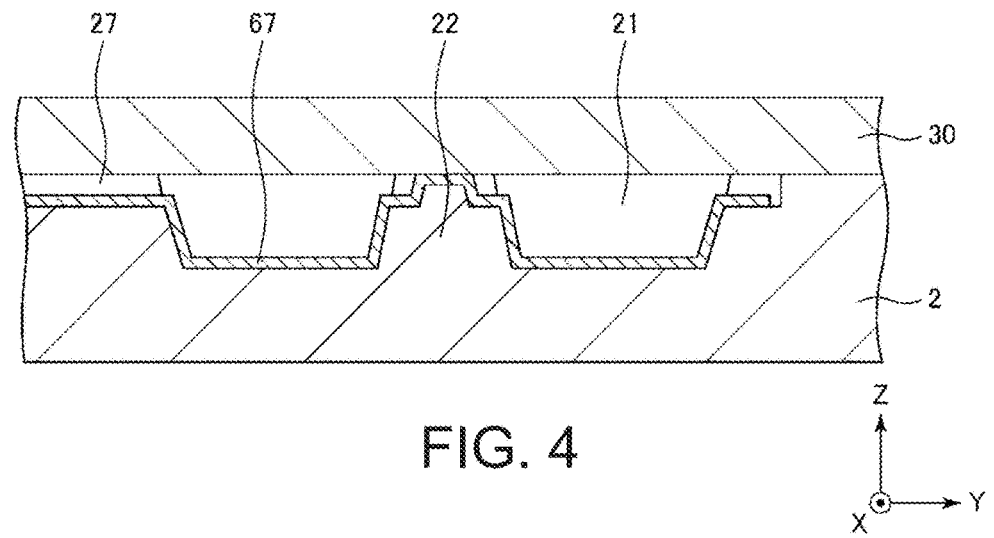
FIG. 4 is a cross-sectional view illustrating a method of forming an element portion.
Figure 5:
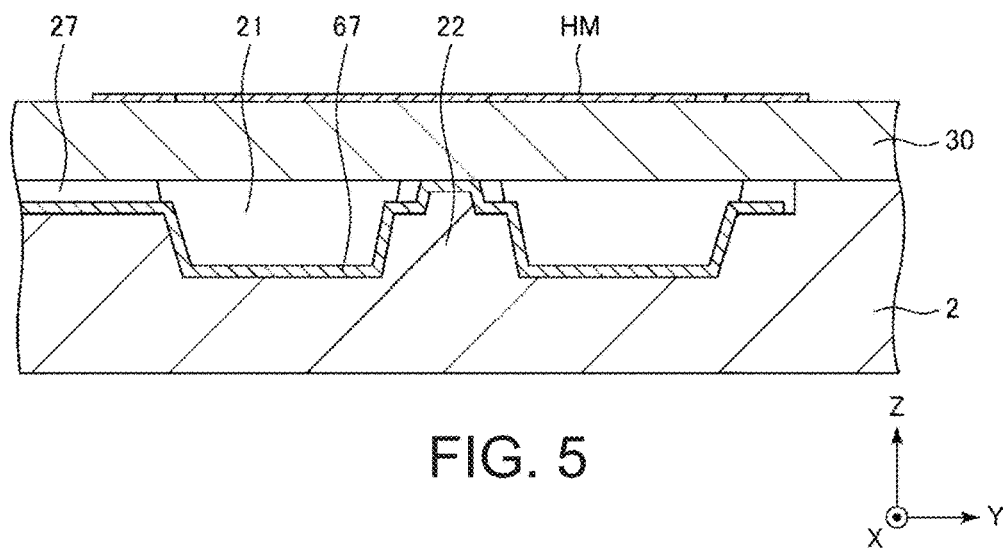
FIG. 5 is another cross-sectional view illustrating the method of forming the element portion.
Figure 6:
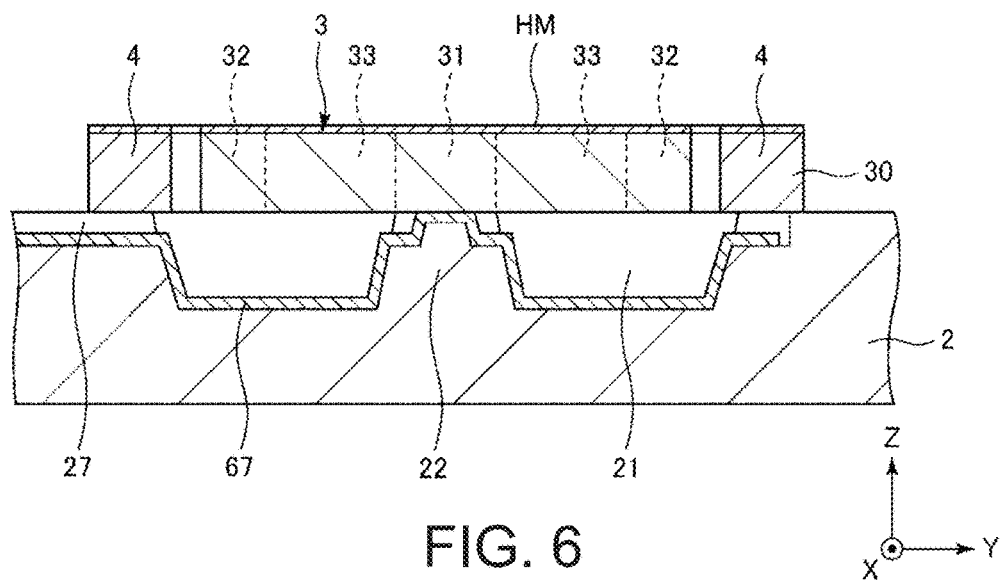
FIG. 6 is another cross-sectional view illustrating the method of forming the element portion.
Figure 7:
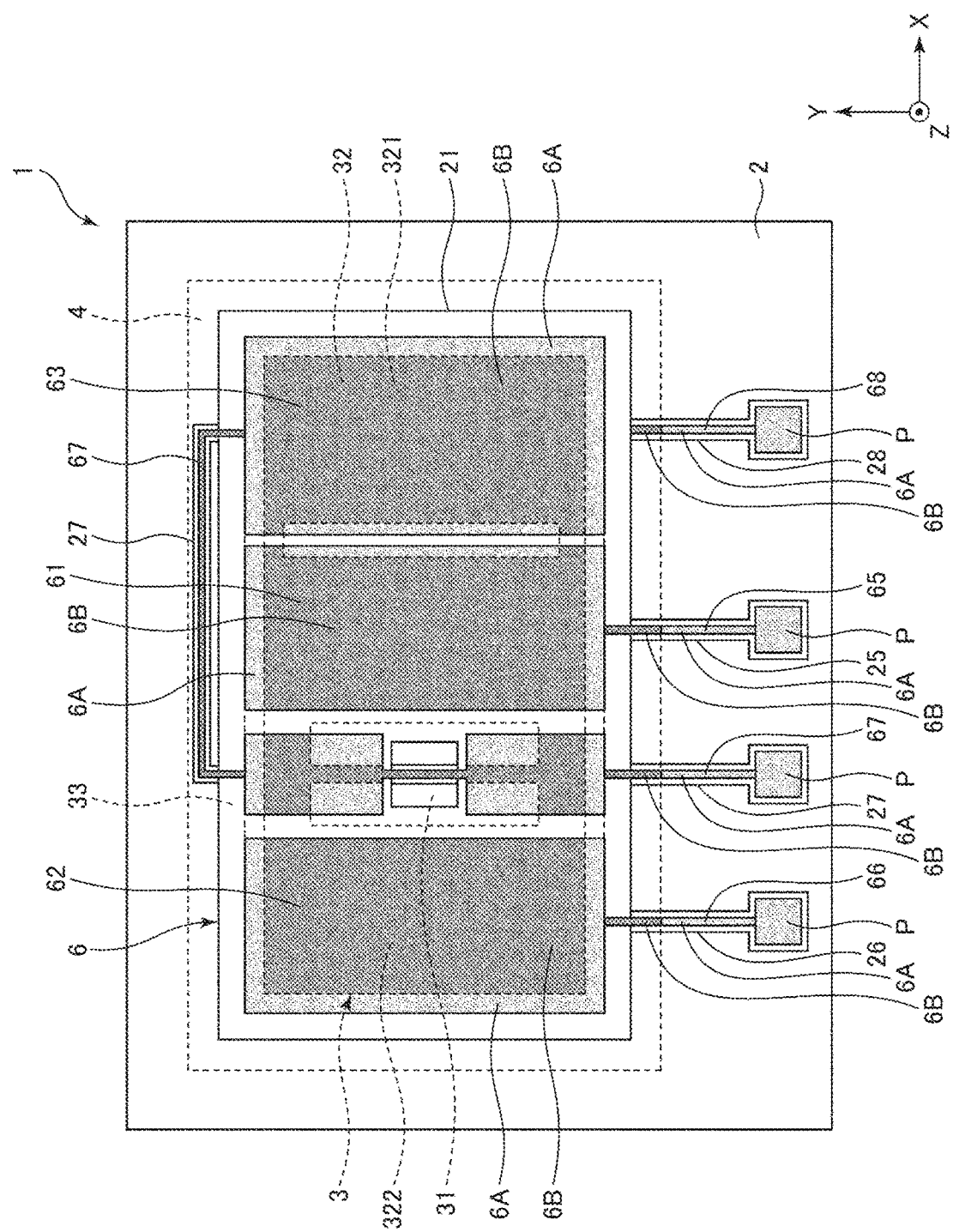
FIG. 7 is a plan view illustrating a conductor pattern included in the physical quantity sensor illustrated in FIG. 1.
Figure 8:
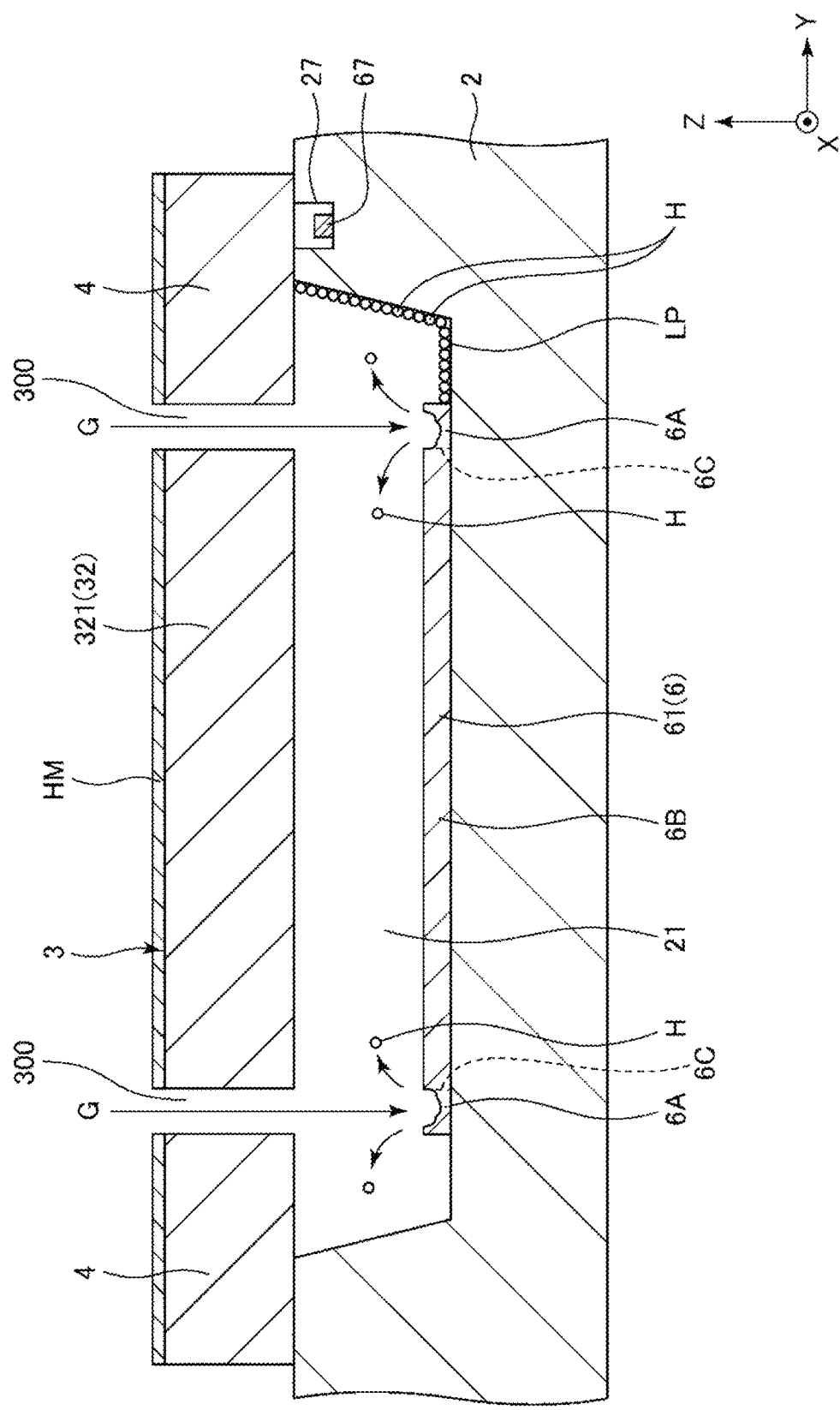
FIG. 8 is a cross-sectional view taken along line B-B in FIG. 1.
Figure 9:
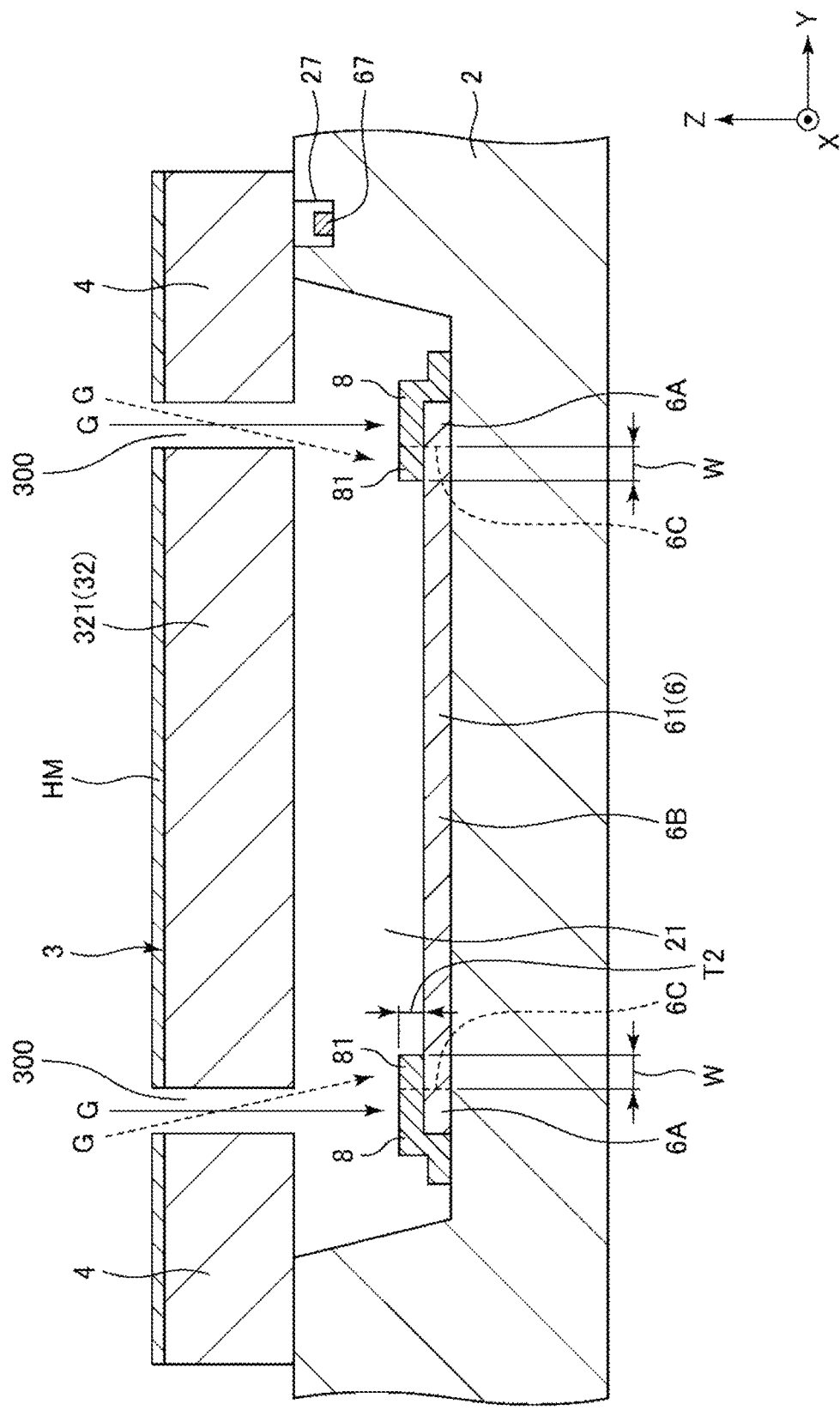
FIG. 9 is another cross-sectional view taken along line B-B in FIG. 1.
Figure 10:
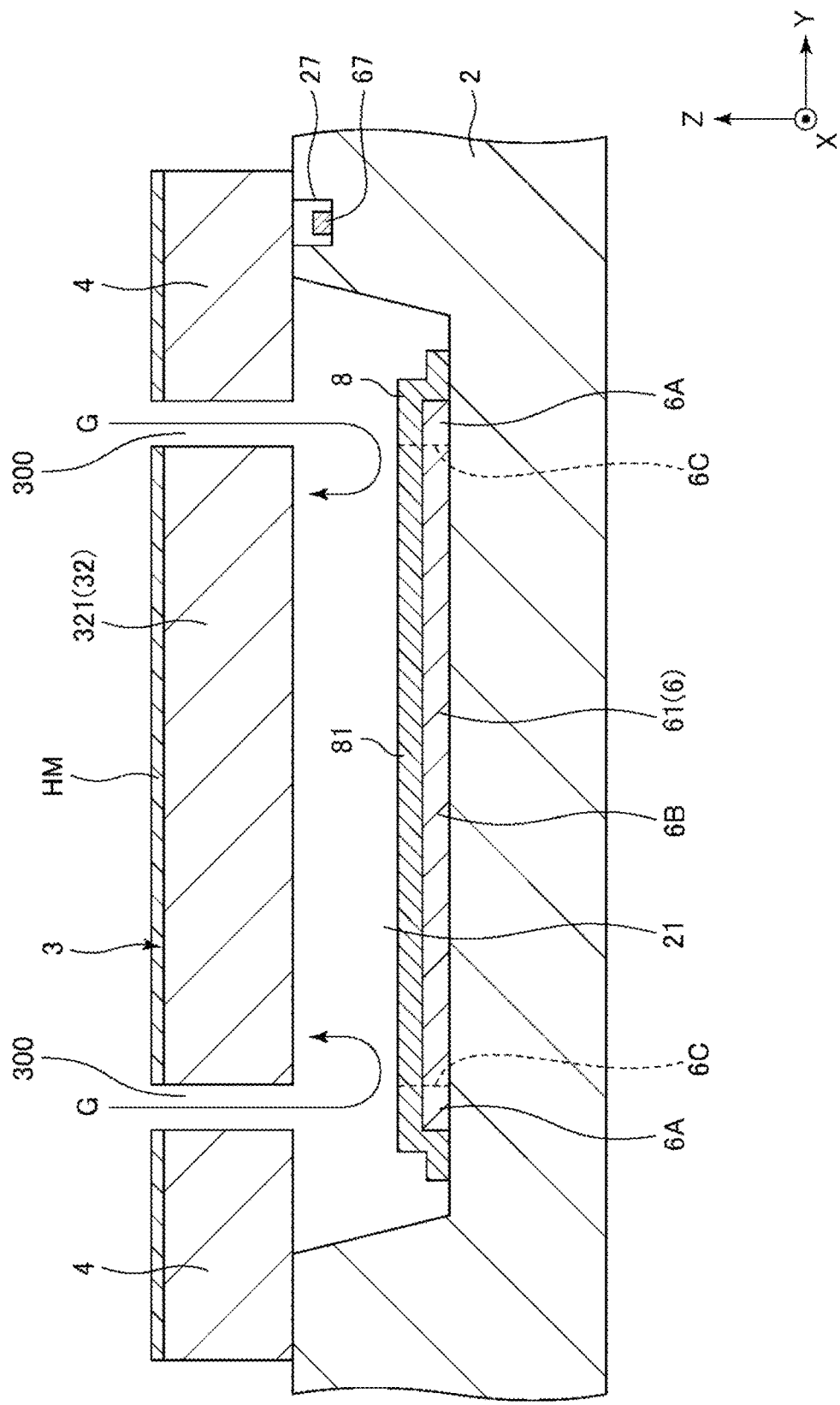
FIG. 10 is another cross-sectional view taken along line B-B in FIG. 1.
Figure 11:
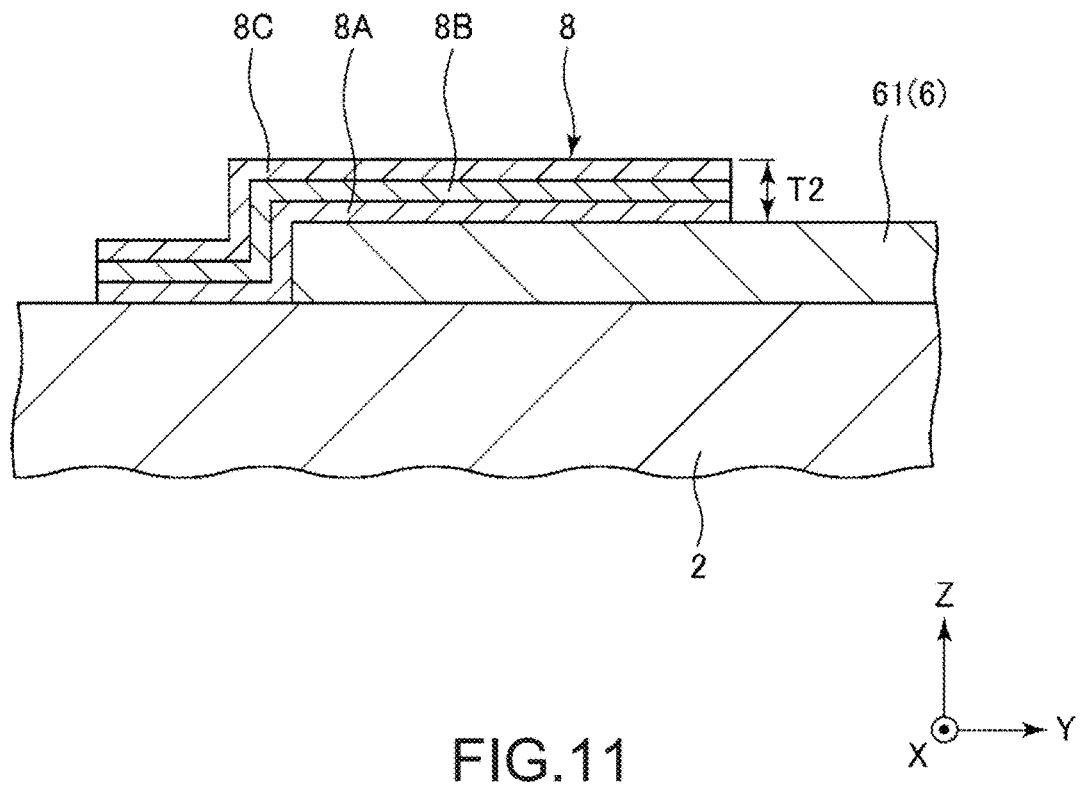
FIG. 11 is a cross-sectional view of a protection film.
Figure 12:
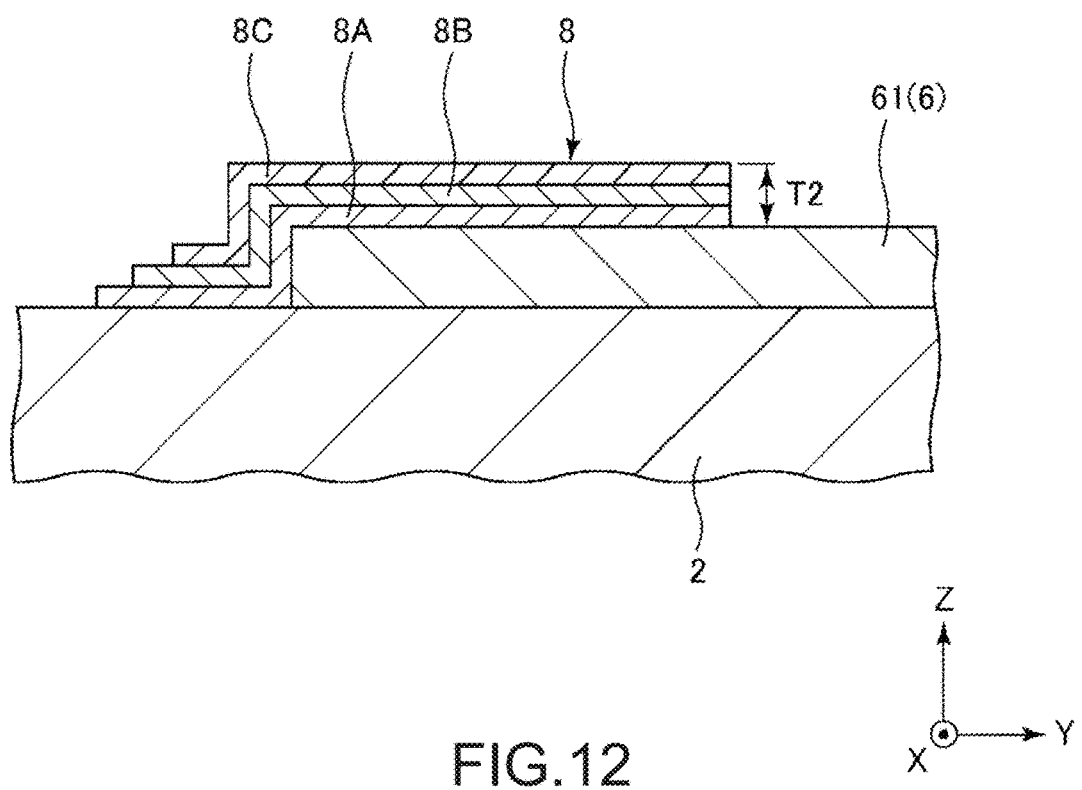
FIG. 12 is another cross-sectional view of the protection film.
Figure 13:
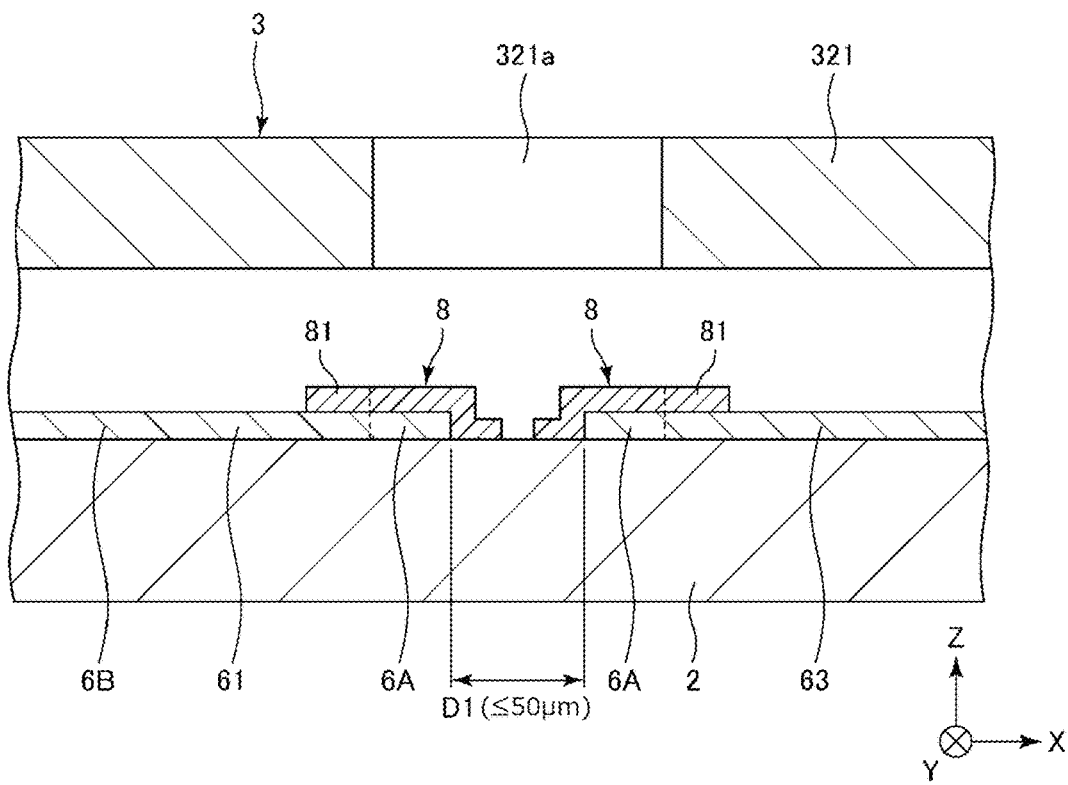
FIG. 13 is a cross-sectional view taken along the line C-C in FIG. 1.
Figure 14:
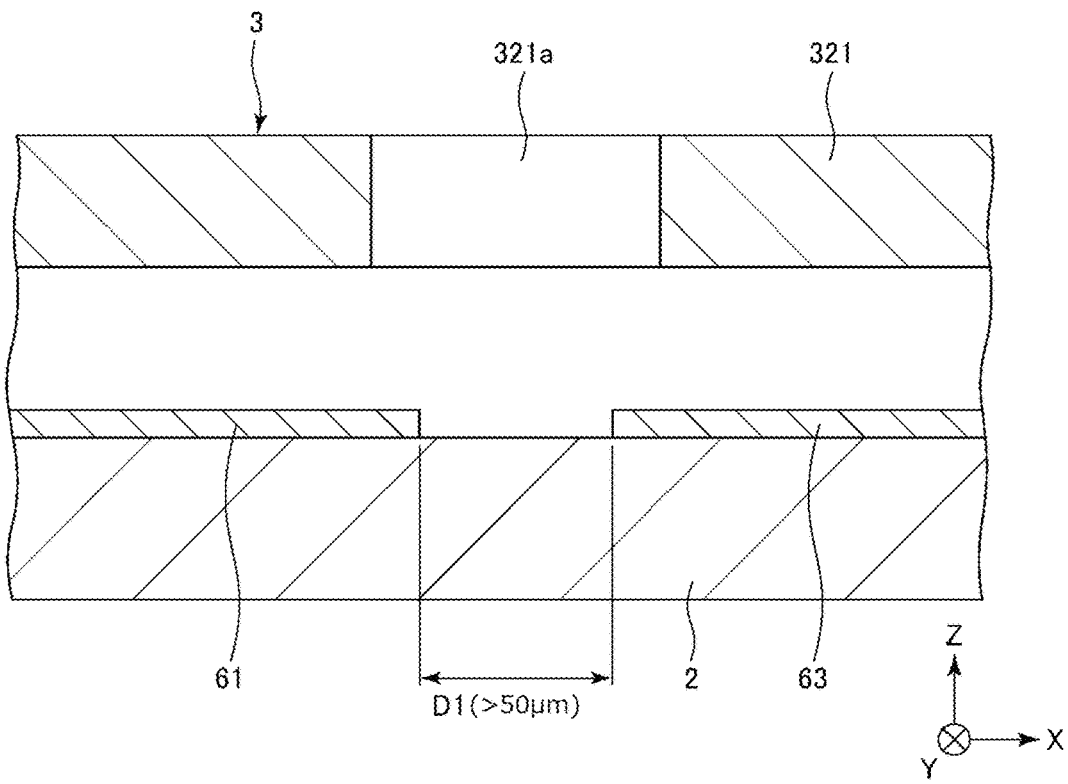
FIG. 14 is another cross-sectional view taken along line C-C in FIG. 1.
Figure 15:
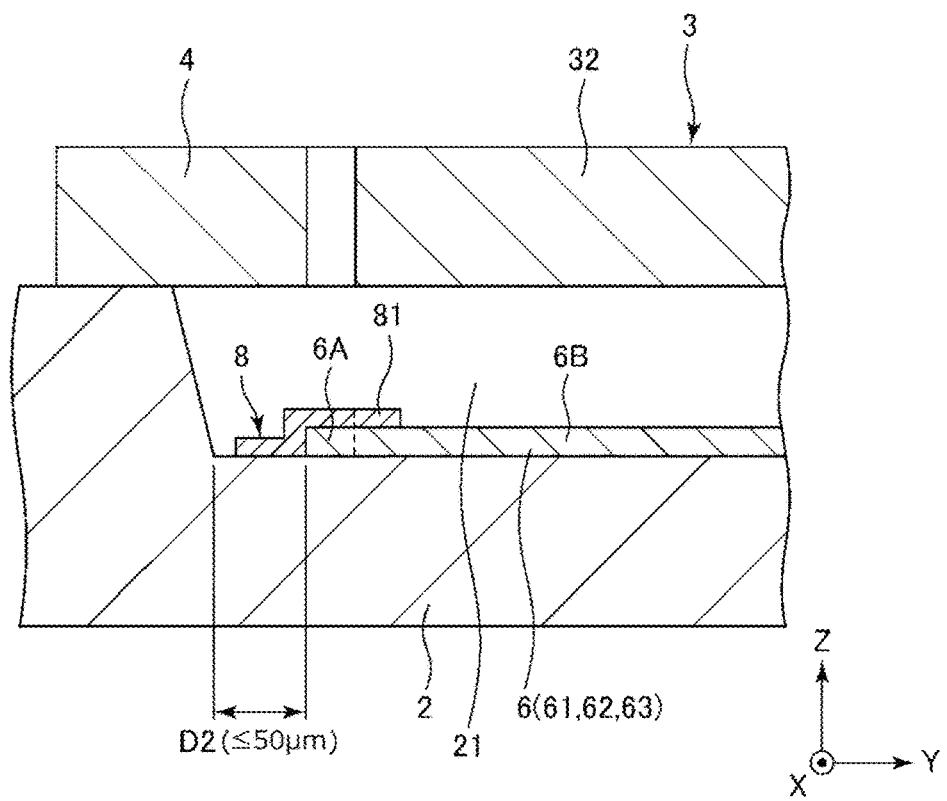
FIG. 15 is a cross-sectional view of the physical quantity sensor illustrated in FIG. 1.
Figure 16:
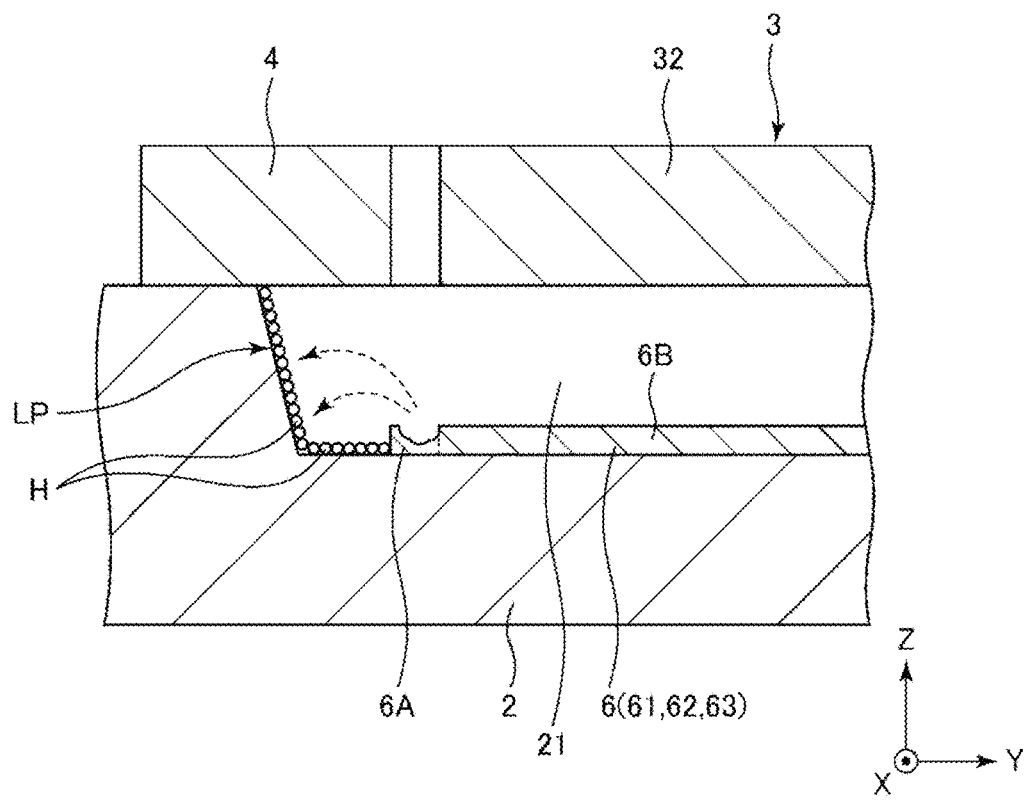
FIG. 16 is another cross-sectional view of the physical quantity sensor illustrated in FIG. 1.
Figure 17:
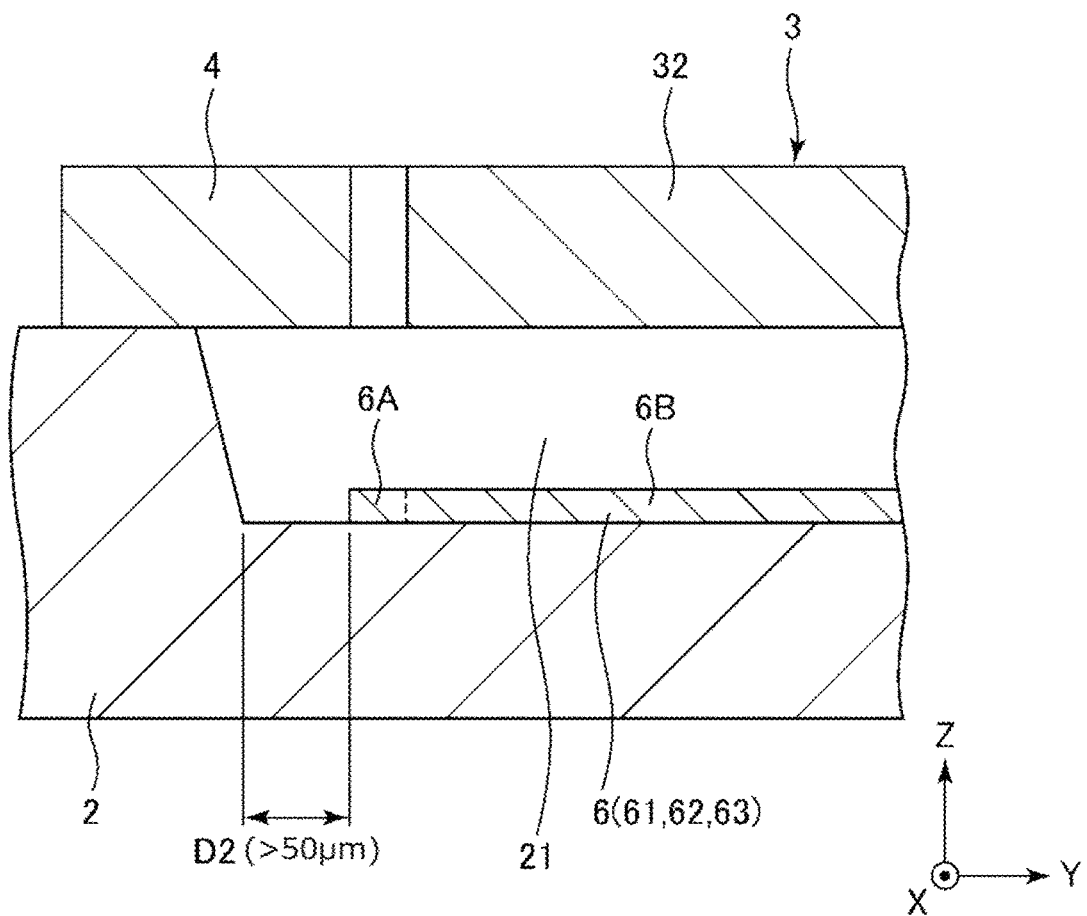
FIG. 17 is another cross-sectional view of the physical quantity sensor illustrated in FIG. 1.
Figure 18:
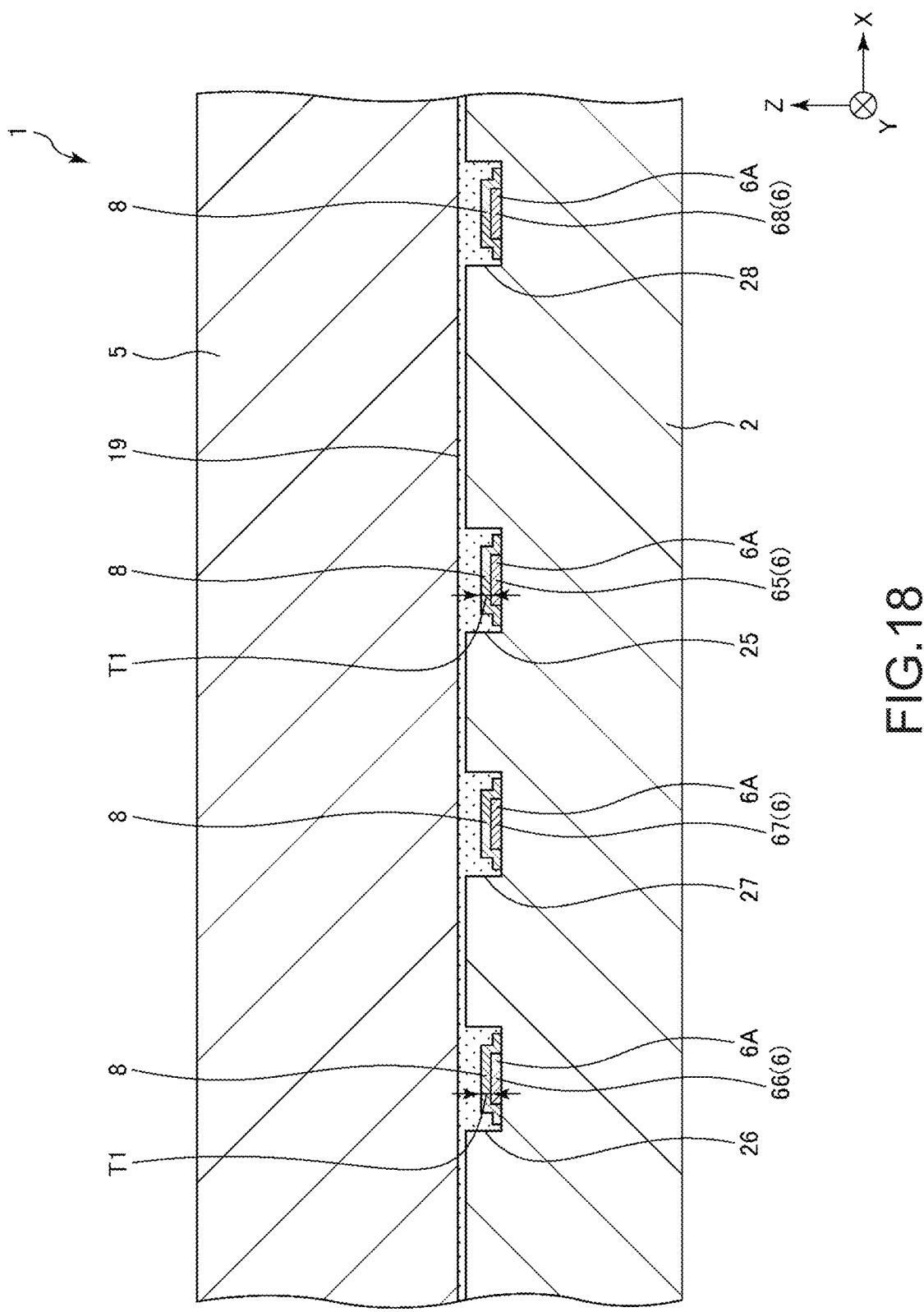
FIG. 18 is a cross-sectional view taken along the line D-D in FIG. 1.

FIG. 1 is a plan view illustrating a physical quantity sensor according to a first embodiment. FIG. 2 is a cross-sectional view taken along the line A-A in FIG. 1. FIG. 3 is a diagram illustrating a voltage pattern to be applied to the physical quantity sensor illustrated in FIG. 1. FIGS. 4 to 6 are cross-sectional views illustrating a method of forming an element portion, respectively. FIG. 7 is a plan view illustrating a conductor pattern included in the physical quantity sensor illustrated in FIG. 1. FIGS. 8 to 10 are cross-sectional views taken along line B-B in FIG. 1, respectively. FIGS. 11 and 12 are cross-sectional views of a protection film, respectively. FIGS. 13 and 14 are cross-sectional views taken along line C-C in FIG. 1, respectively. FIGS. 15 to 17 are cross-sectional views of the physical quantity sensor illustrated in FIG. 1, respectively. FIG. 18 is a cross-sectional view taken along line D-D FIG. 1.

For the convenience of explanation, in each drawing, the X-axis, Y-axis, and Z-axis are illustrated as three axes orthogonal to each other. Also, a direction parallel to the X-axis is referred to as an "X-axis direction", a direction parallel to the Y-axis is referred to as a "Y-axis direction", and a direction parallel to the Z-axis is referred to as a "Z-axis direction". The tip end side of the arrow in each axis direction is also called "plus side", and the base end side in each axis direction is also called "minus side". In addition, the plus side in the Z-axis direction is also referred to as "upper", and the minus side in the Z-axis direction is also referred to as "lower". For the convenience of explanation, illustration of the protection film 8 is omitted in FIGS. 1, 2, and 4 to 8.

The physical quantity sensor 1 illustrated in FIG. 1 is an acceleration sensor capable of measuring acceleration Az in the Z-axis direction. The physical quantity sensor 1 includes a substrate 2, an element portion 3 and a shield portion 4 disposed on the substrate 2, a lid 5 bonded to the substrate 2 so as to cover the element portion 3 and the shield portion 4, a conductor pattern 6 disposed on the substrate 2, and a protection film 8 (not illustrated in FIG. 1).

As illustrated in FIG. 1, the substrate 2 includes a concave portion 21 and grooves 25, 26, 27, and 28 which open to the upper surface side. The concave portion 21 is formed larger than the element portion 3 so as to enclose the element portion 3 inside, in a plan view from the Z-axis direction. The concave portion 21 functions as a relief portion for preventing contact between the element portion 3 and the substrate 2. As illustrated in FIG. 2, the substrate 2 includes a mount portion 22 protruding from the bottom surface of the concave portion 21. The element portion 3 is bonded to the upper surface of the mount portion 22. With this configuration, the element portion 3 is supported by the substrate 2 in a state of being separated from the bottom surface of the concave portion 21.

In the first embodiment, a glass substrate made of a glass material containing alkali metal ions, for example, borosilicate glass such as Tempax glass (registered trademark) or Pyrex glass (registered trademark) is used as the substrate 2. However, the substrate 2 is not limited to the glass substrate, and for example, a silicon substrate, a silicon on insulator (SOI) substrate, a ceramic substrate, or the like may be used as the substrate 2.

On such a substrate 2, a conductor pattern 6 is provided. As illustrated in FIG. 1, the conductor pattern includes a first fixed electrode 61, a second fixed electrode 62, and a dummy electrode 63 disposed on the bottom surface of the concave portion 21, and wirings 65, 66, 67, and 68 disposed in the grooves 25, 26, 27, and 28. One ends of the wirings 65, 66, 67, and 68 are exposed to the outside of the lid 5, respectively, and function as electrode pads P for electrical connection with external devices, respectively. The wiring 65 is electrically connected to the first fixed electrode 61. The wiring 66 is electrically connected to the second fixed electrode 62. The wiring 67 is electrically connected to the element portion 3 on the mount portion 22, and is also electrically connected to the dummy electrode 63. The wiring 68 is electrically connected to the shield portion 4.

The constituent material of the conductor pattern 6 is not particularly limited, and examples thereof include metal materials such as gold (Au), silver (Ag), platinum (Pt), palladium (Pd), iridium (Ir), copper (Cu), aluminum (Al), nickel (Ni), Ti (titanium), tungsten (W) or the like, alloys (TiN, AlCu, AlSiCu, and the like) containing these metallic materials, an oxide based transparent conductive material such as indium tin oxide (ITO), indium zinc oxide (IZO), indium tin oxide (ZnO), IGZO, and the like. One kind or a combination of two or more kinds of these constituent materials can be used (as a laminated body of two or more layers, for example). In addition, for example, the material and the configuration may be different between the first fixed electrode 61, the second fixed electrode 62, the dummy electrode 63, and the wirings 65, 66, 67, and 68.

As illustrated in FIG. 2, the lid 5 includes a concave portion 51 that opens to the lower surface side. The lid 5 is bonded to the upper surface of the substrate 2 so as to accommodate the element portion 3 and the shield portion 4 in the concave portion 51. An accommodation space S for accommodating the element portion 3 and the shield portion 4 is formed inside the lid 5 and the substrate 2.

It is preferable that the accommodation space S is substantially at atmospheric pressure at an operating temperature (for example, about −40° C. to +120° C.) with an inert gas such as nitrogen, helium, argon or the like sealed therein. By setting the accommodation space S to the atmospheric pressure, viscous resistance is increased and a damping effect is exerted, so that vibration of the element portion 3 can be promptly converged. For that reason, measurement accuracy of the acceleration Az of the physical quantity sensor 1 is improved.

In the first embodiment, a silicon substrate is used as the lid 5. However, the lid 5 is not limited to the silicon substrate, and for example, a glass substrate or a ceramic substrate may be used as the lid 5. Although a method of bonding the substrate 2 and the lid 5 is not particularly limited and may be appropriately selected depending on materials of the substrate 2 and the lid 5, in the first embodiment, however, the substrate 2 and the lid 5 may be bonded via a glass frit 19 (low melting point glass). As other methods of bonding the substrate 2 and the lid 5, adhesive bonding, anodic bonding, room temperature bonding, direct bonding, and siloxane bonding may be used.

As illustrated in FIGS. 1 and 2, the element portion 3 includes a fixed portion 31 fixed to the upper surface of the mount portion 22, a movable portion 32, and a beam 33 as a torsion spring connecting the fixed portion 31 and the movable portion 32 so that the movable portion 32 can be swung relative to the fixed portion 31. In such an element portion 3, when the acceleration Az is received, the movable portion 32 swings (rotates) in a see-saw fashion around a swing axis J formed by the beam 33. The movable portion 32 has an elongated shape extending in an X direction, a portion on the plus side in an X-axis direction with respect to the swing axis J constitutes a first movable portion 321, and a portion on the plus side in the X-axis direction with respect to the swing axis J constitutes a second movable portion 322. The first movable portion 321 is longer in the X-axis direction than the second movable portion 322 and rotation moment of the first movable portion 321 when the acceleration Az is applied is larger than that of the second movable portion 322. Due to difference in rotation moment, when the acceleration Az is applied, the movable portion 32 swings around the swing axis J according to the direction and the size of the acceleration Az.

Returning to the description of the conductor pattern 6, as illustrated in FIG. 1, the first fixed electrode 61 is disposed on the bottom surface of the concave portion 21 so as to face the first movable portion 321, and the second fixed electrode 62 is disposed on the bottom surface of the concave portion 21 so as to face the second movable portion 322. These first and second fixed electrodes 61 and 62 are symmetrically disposed with respect to the swing axis J in a plan view as viewed from the Z-axis direction. The dummy electrode 63 is disposed so as to cover a region of the bottom surface of the concave portion 21 where the first and second fixed electrodes 61 and 62 are not disposed. In the first embodiment, the dummy electrode 63 is disposed on the bottom surface of the concave portion 21 so as to face a portion on the tip end side of the first movable portion 321 (side far from the swing axis J).

The dummy electrode 63 has the following function. For example, in a case where the surface of the substrate 2 is exposed from the bottom surface (particularly, a region overlapping the element portion 3) of the concave portion 21, there is a concern that an electrostatic attractive force is generated between the bottom surface of the concave portion 21 and the movable portion 32 by charging the bottom surface of the concave portion 21 (charging caused by migration of alkali metal ions) such that the movable portion 32 swings due to the electrostatic attractive force, that is, a force other than the acceleration Az to be measured, and measurement accuracy of the acceleration Az is decreased. Accordingly, in the first embodiment, the dummy electrode 63 is disposed so that the surface of the substrate 2 is not exposed as much as possible from the bottom surface of the concave portion 21, thereby reducing the problem described above. Since the dummy electrode 63 is electrically connected to the wiring 67 together with the element portion 3, the dummy electrode 63 is at the same potential as the element portion 3. For that reason, substantially no electrostatic attractive force acts between the dummy electrode 63 and the element portion 3, swinging of the movable portion 32 due to the electrostatic attractive force is suppressed so that a decrease in measurement accuracy of the acceleration Az can be reduced.

Returning to description of the movable portion again, as illustrated in FIG. 1, the first movable portion 321 includes a through-hole 321a (slit) extending in the Y-axis direction between a portion facing the first fixed electrode 61 and a portion facing the dummy electrode 63. By providing such a through-hole 321a air resistance (damping) when the movable portion 32 swings around the swing axis J is reduced, and drift reduction due to charging of the substrate 2 (glass surface) is reduced, or collapse of an area balance due to misalignment is reduced, so that detection sensitivity of the acceleration Az is improved. The shape and number of the through-holes 321a are not particularly limited. For example, the through-holes may be formed also in other portions of the movable portion 32 for the same purpose.

When the physical quantity sensor 1 is in operation, for example, a voltage V1 in FIG. 3 is applied to the element portion 3 and a voltage V2 in FIG. 3 is applied to the first and second fixed electrodes 61 and 62. As a result, an electrostatic capacitance C1 is formed between the first movable portion 321 and the first fixed electrode 61, and an electrostatic capacitance C2 is formed between the second movable portion 322 and the second fixed electrode 62. In this state, when the acceleration Az is applied to the physical quantity sensor 1, the movable portion 32 swings around the swing axis J, and magnitudes of the electrostatic capacitances C1 and C2 change in accordance with swinging of the movable portion 32. In the physical quantity sensor 1, the acceleration Az can be measured based on such changes in the electrostatic capacitances C1 and C2.

As illustrated in FIG. 1, the shield portion 4 is bonded to the upper surface of the substrate 2. The shield portion 4 has a frame shape in a plan view as viewed from the Z-axis direction and is disposed to surround the element portion 3. When the physical quantity sensor 1 is in operation, the shield portion 4 is connected to the ground (0 V). With this configuration, disturbance (noise) affecting the element portion 3 can be blocked by the shield portion 4, and measurement accuracy of the acceleration Az is improved. The configuration of the shield portion 4 is not particularly limited, and a portion of the frame shape may be missing as long as it is disposed so as to surround at least a part of the periphery of the element portion 3. Further, such a shield portion 4 may be omitted.

The element portion 3 and the shield portion 4 have been described as above. The element portion 3 and the shield portion 4 can be formed, for example, as follows. First, as illustrated in FIG. 4, a silicon substrate 30 bonded to the upper surface of the substrate 2 and doped with impurities such as phosphorus (P), boron (B), arsenic (As) or the like is prepared. Next, as illustrated in FIG. 5, a hard mask HM including openings corresponding to shapes of the element portion 3 and the shield portion 4 is formed on the upper surface of the silicon substrate 30. Next, as illustrated in FIG. 6, the silicon substrate 30 is subjected to dry etching (particularly, Bosch method) via the hard mask HM. As described above, the element portion 3 and the shield portion 4 are collectively formed from the silicon substrate 30.

The protection film 8 has a function of protecting the conductor pattern 6 from dry etching at the time of forming the element portion 3 and the shield portion 4. As illustrated in FIG. 7, the conductor pattern 6 does not overlap with the element portion 3 and the shield portion 4 in a plan view from the Z-axis direction, and includes an exposed portion 6A exposed from the element portion 3 and the shield portion 4 and an unexposed portion 6B (overlapping portion) which overlaps the element portion 3 and the shield portion 4 and is not exposed therefrom. In the first embodiment, the exposed portion 6A is present at the outer edge portion of the first fixed electrode 61, the outer edge portion of the second fixed electrode 62, the outer edge portion of the dummy electrode 63, and the wirings 65, 66, 67, and 68. In FIG. 7, for the sake of clarity, the exposed portion 6A is illustrated in a light gray scale and the unexposed portion 6B is illustrated in a dark gray scale.

Here, in the method of forming the element portion 3 described above, in order to reliably form the element portion 3 and the shield portion 4 from the silicon substrate 30, the silicon substrate 30 is generally subjected to overetching. That is, even after a through-hole 300 for separating the element portion 3 and the shield portion 4 is formed in the silicon substrate 30, the dry etching is continued for a while. For that reason, as illustrated in FIG. 8, there is a concern that a portion of the conductor pattern 6 positioned immediately under the through-hole 300, that is, the exposed portion 6A is damaged by an attack of reactive gas G. With this configuration, there is a concern that for example, a portion of the first fixed electrode 61 and the second fixed electrode 62 is removed, deviation occurs in the electrostatic capacitances C1 and C2, a portion of the dummy electrode 63 is removed, the surface of the substrate 2 is exposed from the removal and deviation to cause undesirable electrostatic attraction between the element portion 3 and the surface, splashes H of the removed conductor pattern 6 are reattached to the substrate 2, the accuracy of the physical quantity sensor 1 decreases as an insulation resistance value decreases, or the wirings 65, 66, 67, and 68 are disconnected to cause troubles.

Accordingly, as illustrated in FIG. 9, in the physical quantity sensor 1, in order to protect the exposed portion 6A from the attack of the reactive gas G, the protection film 8 covering the exposed portion 6A is disposed. With this configuration, the attack of the reactive gas G on the conductor pattern 6 is suppressed, and the conductor pattern 6 is less likely to be damaged. For that reason, the problems described above (problems such as the deviation occurs in the electrostatic capacitances C1 and C2, undesirable electrostatic attraction occurs, the insulation resistance decreases due to reattachment of droplets H, and disconnection occurs in the wirings 65, 66, 67 and 68, thereby causing characteristic deterioration and breakdown of the physical quantity sensor 1) hardly occur.

As illustrated in FIG. 8, since the reactive gas G moves in a direction orthogonal to the silicon substrate 30, theoretically, as long as the protection film 8 only covers the exposed portion 6A, its purpose (protection of the exposed portion 6A) can be achieved. However, depending on disposition of the silicon substrate 30 in the etching apparatus or the etching apparatus, the reactive gas G may move slightly obliquely as indicated by the chain line in FIG. 9. Positional deviation may occur when the protection film 8 is formed or a portion of the exposed portion 6A may be exposed from the protection film 8 in some cases. Accordingly, in the first embodiment, the protection film 8 is disposed so as to slightly overlap the unexposed portion 6B beyond a boundary 6C between the exposed portion 6A and the unexposed portion 6B. That is, the protection film 8 includes an overlapping portion 81 overlapping the element portion 3 in a plan view from the Z-axis direction.

As illustrated in FIG. 10, even if the entire area of the conductor pattern 6 is covered with the protection film 8, the purpose of protecting the exposed portion 6A from the attack of the reactive gas G can be achieved. However, with such a configuration, there is a concern that an area of the overlapping portion 81 is large, the electrostatic capacitances C1 and C2 vary despite the fact that the acceleration Az is not applied, due to charging of the protection film 8. In addition, there is a concern that a repulsive force acts on the reactive gas G due to charging of the protection film 8 and the reactive gas G attacks the silicon substrate 30 from the lower surface side and damages the element portion 3.

Due to these factors, a decrease of the mechanical strength of the element portion 3 and deterioration of detection characteristics of the physical quantity sensor 1 are caused. Accordingly, it is preferable that the portions of the first fixed electrode 61, the second fixed electrode 62, and the dummy electrode 63 that face the element portion 3 are exposed as wide as possible from the protection film 8. In other words, it is preferable that the overlapping portion 81 is small as far as the purpose can be achieved. A width W (see FIG. 9) of the overlapping portion 81 is not particularly limited, and varies depending on the depth of the concave portion 21. However, for example, if the depth of the concave portion 21 is 0.1 μm or more and 10 μm or less, the width is preferably 1 μm or more and 10 μm or less. With this configuration, the purpose of the overlapping portion 81 can be sufficiently achieved, the area of the overlapping portion 81 can be made sufficiently small, and deterioration of detection characteristics of the physical quantity sensor 1 can be effectively reduced.

The attack of the reactive gas G may also occur in the unexposed portion 6B due to a reflection action. For that reason, even in the unexposed portion 6B, it is conceivable that reattachment of splashes H occurs and the insulation resistance value decrease, and thus, in this case, similar to the exposed portion 6A, it is preferable to cover the unexposed portion 6B with the protection film 8 (for example, an electrode of a correction capacitance on the side in the Z-axis and Y-axis directions).

Although the configuration of the protection film 8 as described above is not particularly limited, in the first embodiment, the protection film 8 has a configuration in which the first layer 8A, the second layer 8B, and the third layer 8C are laminated in this order, as illustrated in FIGS. 11 and 12. Among the layers, the first layer 8A functions as a primer layer for improving adhesiveness with the substrate 2 and the conductor pattern 6, and the second layer 8B and the third layer 8C function as a protection layer for protecting the conductor pattern 6 from the reactive gas G.

The constituent material of the first layer 8A is not particularly limited, and examples thereof include metal materials such as chromium (Cr), nickel (Ni), titanium (Ti), tungsten (W), alloys containing these metal materials, and the like can be used. In the first embodiment, the first layer 8A is made of TiW. The constituent materials of the second layer 8B and the third layer 8C are not particularly limited, and materials having high durability against the reactive gas G, for example, silicon materials such as silicon oxide ($SiO_2$) and silicon nitride (SiN), diamond like carbon (DLC), various resin materials, and the like can be used as the constituent materials. In the first embodiment, the second layer 8B is made of silicon oxide, and the third layer 8C is made of the DLC. According to such a configuration, the protection film 8 is excellent in adhesiveness and excellent in resistance to the reactive gas G, and the protection film 8 can be easily formed using a semiconductor process. However, the configuration of the protection film 8 is not particularly limited, and for example, the first layer 8A may be omitted, or one of the second layer 8B and the third layer 8C may be omitted, or furthermore, another layer may be included in the protection film 8.

Here, the protection film 8 may be provided over the entire exposed portion 6A or may be provided only on a portion of the exposed portion 6A. In the following description, the exposed portion 6A where the protection film 8 is to be provided and the exposed portion 6A where the protection film 8 may not be provided will be described.

For example, in the conductor pattern 6 of the first embodiment, as illustrated in FIG. 13, the first fixed electrode 61 (first portion) and the dummy electrode 63 (second portion) are arranged side by side. An end portion of the first fixed electrode 61 on the side of the dummy electrode 63 is the exposed portion 6A, and an end portion of the dummy electrode 63 on the side of the first fixed electrode 61 is also the exposed portion 6A. That is, the exposed portions 6A of the first fixed electrode 61 and the dummy electrode 63 are disposed adjacent to each other.

As illustrated in FIG. 13, in a case where the distance D1 between the first fixed electrode 61 and the dummy electrode 63 is 50 μm or less (first embodiment), the protection film 8 is disposed on the exposed portion 6A of the first fixed electrode 61 and the exposed portion 6A of the dummy electrode 63. The reason is that since the exposed portions 6A of the first fixed electrode 61 and the dummy electrode 63 are close to each other, if the protection film 8 is not provided, the reattachment of splashes H scattered from the conductor pattern 6 tends to form a leak path LP between the first fixed electrode 61 and the dummy electrode 63, and there is a high possibility that the insulation resistance is reduced between the first fixed electrode 61 and the dummy electrode 63.

In contrast, as illustrated in FIG. 14, in a case where the separation distance D1 between the first fixed electrode 61 and the dummy electrode 63 is greater than 50 μm (modification example of the first embodiment), the protection film 8 is not disposed on the exposed portion 6A of the first fixed electrode 61 and the exposed portion 6A of the dummy electrode 63. The reason is that since the exposed portions 6A of the first fixed electrode 61 and the dummy electrode 63 are sufficiently separated from each other, there is a low possibility that a short circuit between the first fixed electrode 61 and the dummy electrode due to reattachment of the splashes H occurs. Furthermore, as described above, when the protection film 8 is disposed, since there is a concern that the electrostatic capacitance C1 varies although the variation is minute due to charging of the overlapping portion 81, such a problem can be prevented by omitting the protection film 8, the physical quantity sensor 1 with higher accuracy can be provided.

The configuration of the physical quantity sensor 1 is not limited to the configuration described above, and even if the distance D1 between the first fixed electrode 61 and the dummy electrode 63 is 50 μm or less, it is not necessary to dispose the protection film 8 on the exposed portion 6A of the first fixed electrode 61 and the exposed portion 6A of the dummy electrode 63. Even if the distance D1 between the first fixed electrode 61 and the dummy electrode 63 is larger than 50 μm, the protection film 8 may be disposed on the exposed portion 6A of the first fixed electrode 61 and the exposed portion 6A of the dummy electrode 63.

In the physical quantity sensor 1, as illustrated in FIG. 7, the first fixed electrode 61, the second fixed electrode 62, and the dummy electrode 63 are disposed so as to spread to the vicinity of the outer edge (side wall) of the concave portion 21, respectively, and the end portions of the first fixed electrode 61, the second fixed electrode 62, and the dummy electrode 63 that face the outer edge of the concave portion 21 are the exposed portion 6A, respectively.

As illustrated in FIG. 15, in a case where the distance D2 between the exposed portion 6A and the outer edge of the concave portion 21 is 50 μm or less (first embodiment), the protection film 8 is disposed on the exposed portion 6A. The reason is that since the exposed portions 6A are close to the outer edge of the concave portion 21, if the protection film 8 is not provided, as illustrated in FIG. 16, there is a high possibility that a short circuit occurs between at least one of the first fixed electrode 61, the second fixed electrode 62, and the dummy electrode 63 and the shield portion 4 due to the leak path LP formed by reattachment of the splashes H scattered from the conductor pattern 6.

In contrast, as illustrated in FIG. 17, in a case where the distance D2 between the exposed portion 6A and the outer edge of the concave portion 21 is larger than 50 μm (modification example of the first embodiment), the protection film 8 is not disposed on the exposed portion 6A. The reason is that since the exposed portion 6A and the outer edge of the concave portion 21 are sufficiently separated from each other, it is difficult to form the leak path LP even by reattachment of the droplets H, and there is a low possibility that a short circuit occurs between at least one of the first fixed electrode 61, the second fixed electrode 62, and the dummy electrode 63 and the shield portion 4. Furthermore, as described above, when the protection film 8 is disposed, since there is a concern that variations in the electrostatic capacitances C1 and C2 may occur although the electrostatic capacitances are minute due to charging of the overlapping portion 81, by omitting the protection film 8, occurrence of such a problem can be prevented and a physical quantity sensor 1 with higher precision can be provided.

The protection film 8 provided on the first fixed electrode 61, the second fixed electrode 62, and the dummy electrode 63 has been described as above. Since the wirings 65, 66, 67 and 68 also have the exposed portions 6A respectively, as illustrated in FIG. 18, the protection film 8 is also provided on the wirings 65, 66, 67, and 68 so as to cover the exposed portions 6A. With this configuration, the wirings 65, 66, 67, 68 can be protected from the attack of the reactive gas G, and in particular, disconnection of the wirings 65, 66, 67, and 68 can be effectively reduced. In order to secure electrical conduction, the surface of the electrode pad P may not necessarily be covered with the protection film 8.

Here, in the first embodiment, the thickness T1 (average thickness) of the protection film 8 provided on the wirings 65, 66, 67, and 68 is thicker than the thickness T2 (planar thickness) of the protection film 8 provided on the first fixed electrode 61, the second fixed electrode 62, and the dummy electrode 63. As described above, the protection film 8 provided on the first fixed electrode 61, the second fixed electrode 62, and the dummy electrode 63 includes the overlapping portion 81 which overlaps the element portion 3. For that reason, in order to suppress variations of the electrostatic capacitances C1 and C2 due to charging of the overlapping portion 81 to be small, it is preferable to make the protection film 8 thin and increase a separation distance between the overlapping portion 81 and the element portion 3. In contrast, since the wirings 65, 66, 67, and 68 do not include the overlapping portion 81, it is not necessary to worry about the problems described above and the protection film 8 can be made thick. From the matters described above, it is possible to effectively reduce the characteristic deterioration of the physical quantity sensor 1 by setting T1 to be larger than T2. Also, if the thickness T2 of the protection film 8 is thick, since there is a concern that the thick thickness may cause movement inhibition of the movable portion 32, it is preferable that the relationship in which depth of the concave portion 21 is larger than (thickness of electrodes 61, 62, 63+thickness of protection film 8) and depth of the concave portion 21 is larger than (thickness of wirings 65, 66, 67, and 68+thickness of protection film 8) is satisfied.

Although the thickness T1 is not particularly limited, it is preferable that the thickness T1 is, for example, 0.1 μm or more and 10 μm or less. Although the thickness T2 is not particularly limited, it is preferable that the thickness T2 is, for example, 0.1 μm or more and 10 μm or less. With this configuration, the effect described above can be exhibited more reliably.

The physical quantity sensor 1 has been described as above. Such a physical quantity sensor 1, as described above, includes the substrate 2, the element portion 3 disposed so as to overlap the substrate 2, the conductor pattern 6 disposed so as to face the element portion 3 on the substrate 2, the protection film 8 covering at least a part of the exposed portion 6A exposed from the element portion 3 of the conductor pattern 6 in a plan view from the direction in which the substrate 2 and the element portion 3 overlap (Z-axis direction). For that reason, during dry etching, the conductor pattern 6 is protected by the protection film 8, and the conductor pattern 6 is less likely to be damaged. As a result, characteristic deterioration and failure of the physical quantity sensor 1 can be effectively suppressed.

As described above, the element portion 3 includes the movable portion 32 including the first movable portion 321 (first mass portion) and the second movable portion 322 (second mass portion), and the fixed portion 31 attached to the substrate 2, and the beam 33 connecting the movable portion 32 and the fixed portion 31. The conductor pattern 6 includes the first fixed electrode 61 disposed to face the first movable portion 321 and the second fixed electrode 62 disposed to face the second movable portion 322. With this configuration, the physical quantity sensor 1 is capable of measuring the acceleration Az in the direction (Z-axis direction) in which the substrate 2 and the element portion 3 overlap each other.

As described above, the movable portion 32 includes the through-hole 321a formed therein. With this configuration, air resistance when the movable portion 32 swings around the swing axis J is reduced, the decrease in drift due to charging of the substrate 2 (glass surface) is reduced or collapse of the area balance due to misalignment is reduced and thus, detection sensitivity of the acceleration Az is improved.

As described above, at least a part of the portion of the first fixed electrode 61 facing the first movable portion 321 is exposed from the protection film 8, and at least a part of the portion of the second fixed electrode 62 facing the second movable portion of 322 is exposed from the protection film 8. With this configuration, there is a concern that the electrostatic capacitances C1 and C2 vary despite the fact that the acceleration Az is not applied, due to charging of the protection film 8, or the repulsive force acts on the reactive gas G due to charging of the protection film 8, and thus, the reactive gas G attacks the silicon substrate 30 from the lower surface side and damages the element portion 3. For that reason, it is possible to effectively reduce a decrease of the mechanical strength of the element portion 3 and deterioration of the detection characteristics of the physical quantity sensor 1.

As described above, the conductor pattern 6 includes wirings 65, 66, 67, and 68. The thickness T1 of the protection film 8 provided on the wirings 65, 66, 67, and 68 is thicker than the thickness T2 of the protection film 8 disposed on each of the first fixed electrode 61, the second fixed electrode 62, and the dummy electrode 63. The protection film 8 provided on the first fixed electrode 61, the second fixed electrode 62, and the dummy electrode 63 includes an overlapping portion 81 that overlaps the element portion 3. For that reason, in order to suppress variations of the electrostatic capacitances C1 and C2 due to charging of the overlapping portion 81 to be small, it is preferable to make the protection film 8 thin and increase a separation distance between the overlapping portion 81 and the element portion 3. In contrast, since the wirings 65, 66, 67, and 68 do not include the overlapping portion 81, it is not necessary to worry about the problems described above and the protection film 8 can be made thick. From the matters described above, it is possible to effectively reduce characteristic deterioration of the physical quantity sensor 1 by setting T1 to be larger than T2.

As described above, the conductor pattern 6 includes the first fixed electrode 61 (first portion) and the dummy electrode 63 (second portion) arranged side by side. At least one of the first fixed electrode 61 and the dummy electrode 63 includes the exposed portion 6A at the outer edge portion on a side of the other of the first fixed electrode 61 and the dummy electrode 63 (both in the first embodiment), and the distance D1 between the first fixed electrode 61 and the dummy electrode 63 is 50 μm or less, and at least a portion (in the first embodiment, all) of the exposed portion 6A is covered with the protection film 8. With this configuration, it is possible to suppress occurrence of splashes H and to effectively reduce the decrease in insulation resistance between the first fixed electrode 61 and the dummy electrode 63.

As described above, the conductor pattern 6 includes the first fixed electrode 61 (first portion) and the dummy electrode 63 (second portion) arranged side by side. At least one of the first fixed electrode 61 and the dummy electrode 63 includes the exposed portion 6A at the outer edge portion on a side of the other of the first fixed electrode 61 and the dummy electrode 63 (both in the first embodiment), and the distance D1 between the first fixed electrode 61 and the dummy electrode 63 is larger than 50 µm, and at least a portion (in the first embodiment, all) of the exposed portion 6A is not covered with the protection film 8. With this configuration, characteristic deterioration due to charging of the protection film 8 can be suppressed, and the physical quantity sensor 1 with higher accuracy can be provided.

As described above, the protection film 8 contains silicon oxide as a constituent material. With this configuration, the protection film 8 is excellent in dry etching resistance and easy to form by a semiconductor process.

As described above, the protection film 8 is formed of a laminated body formed by laminating a plurality of layers (first layer 8A, second layer 8B, and third layer 8C). This makes it easy for the protection film 8 to have various functions (for example, function of protecting the conductor pattern 6 and function of adhering to the substrate 2).

Second Embodiment

Next, a physical quantity sensor according to a second embodiment will be described.

Figure 19:
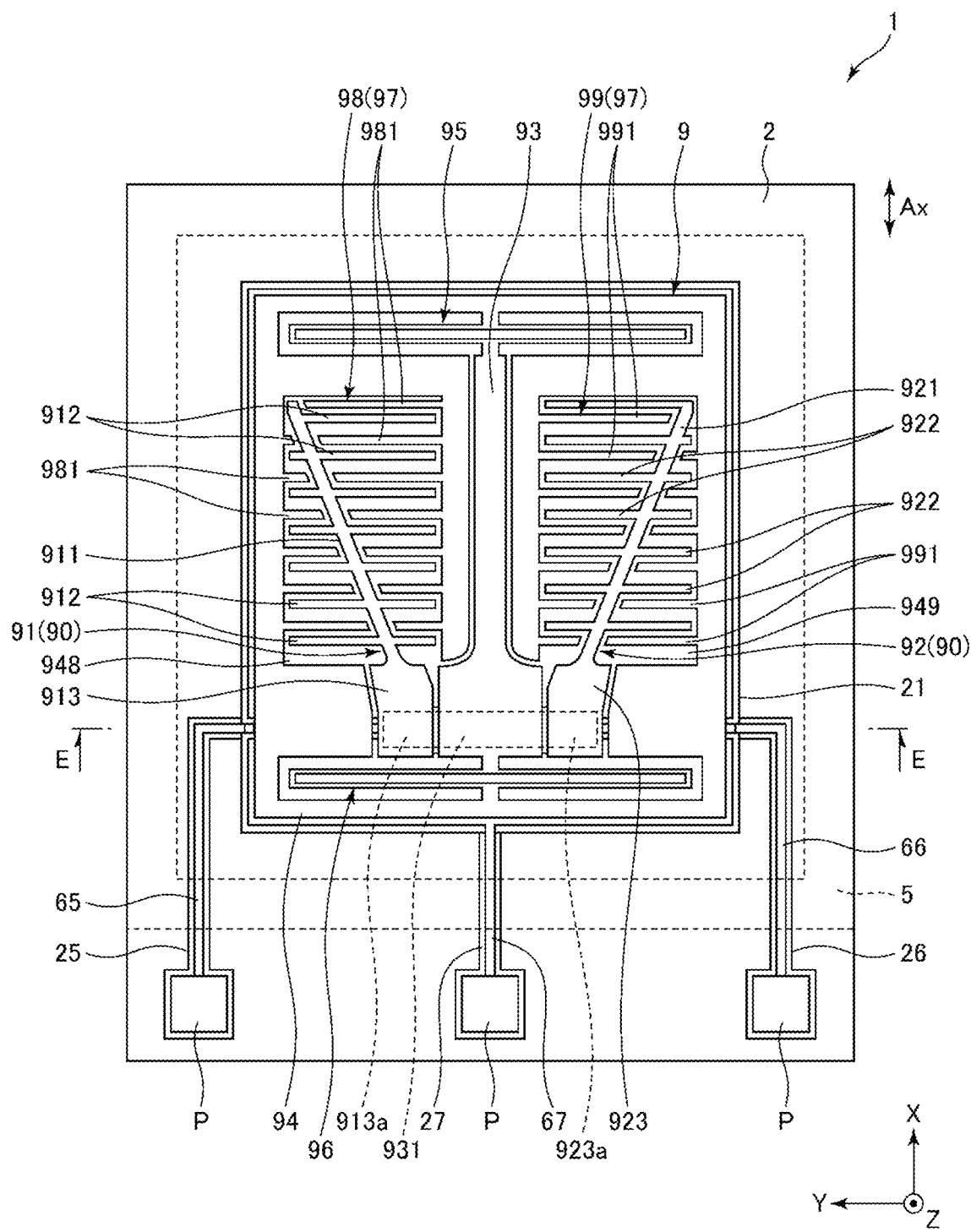
FIG. 19 is a plan view illustrating a physical quantity sensor according to a second embodiment.
Figure 20:
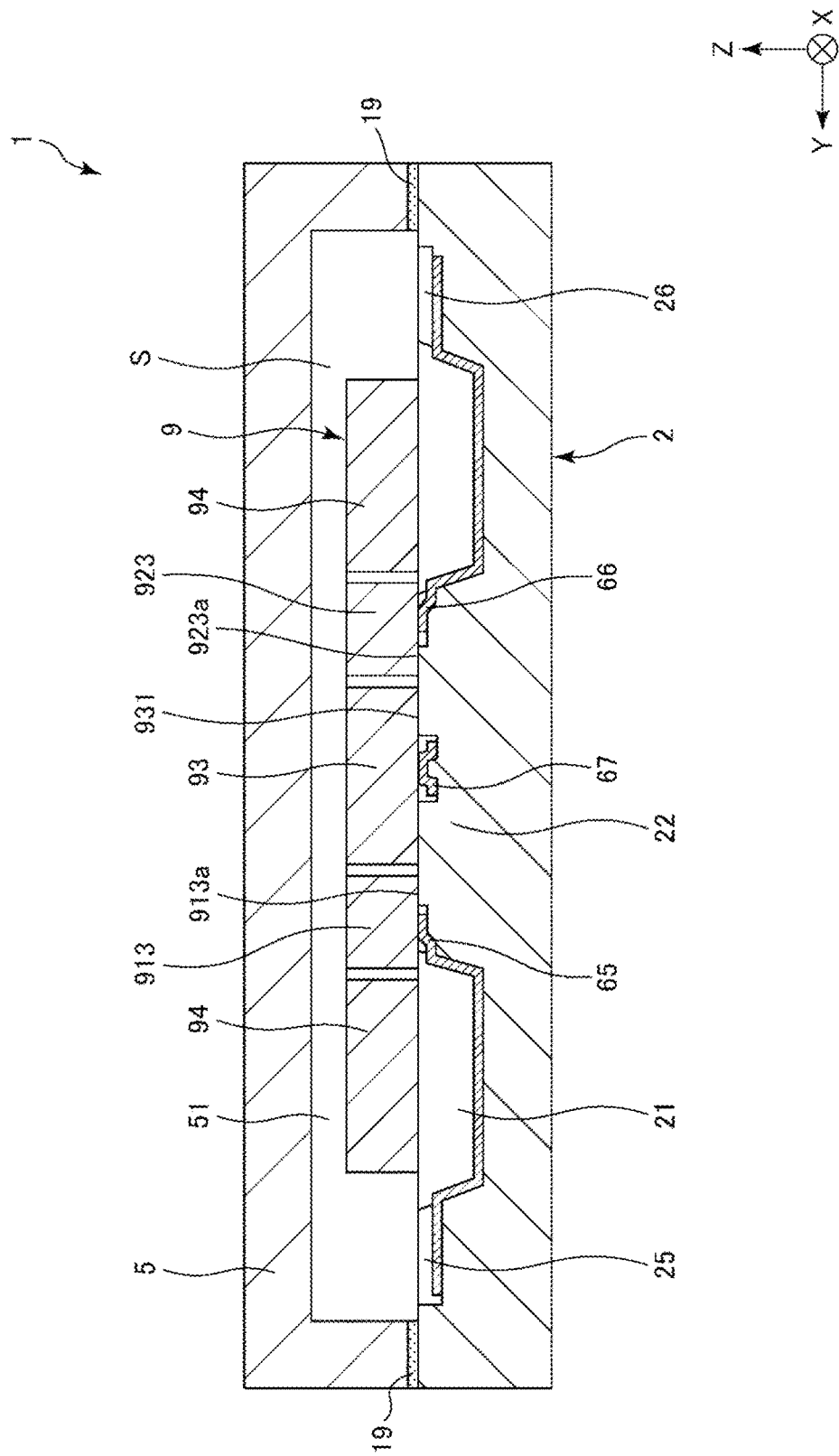
FIG. 20 is a cross-sectional view taken along the line E-E in FIG. 19.
Figure 21:
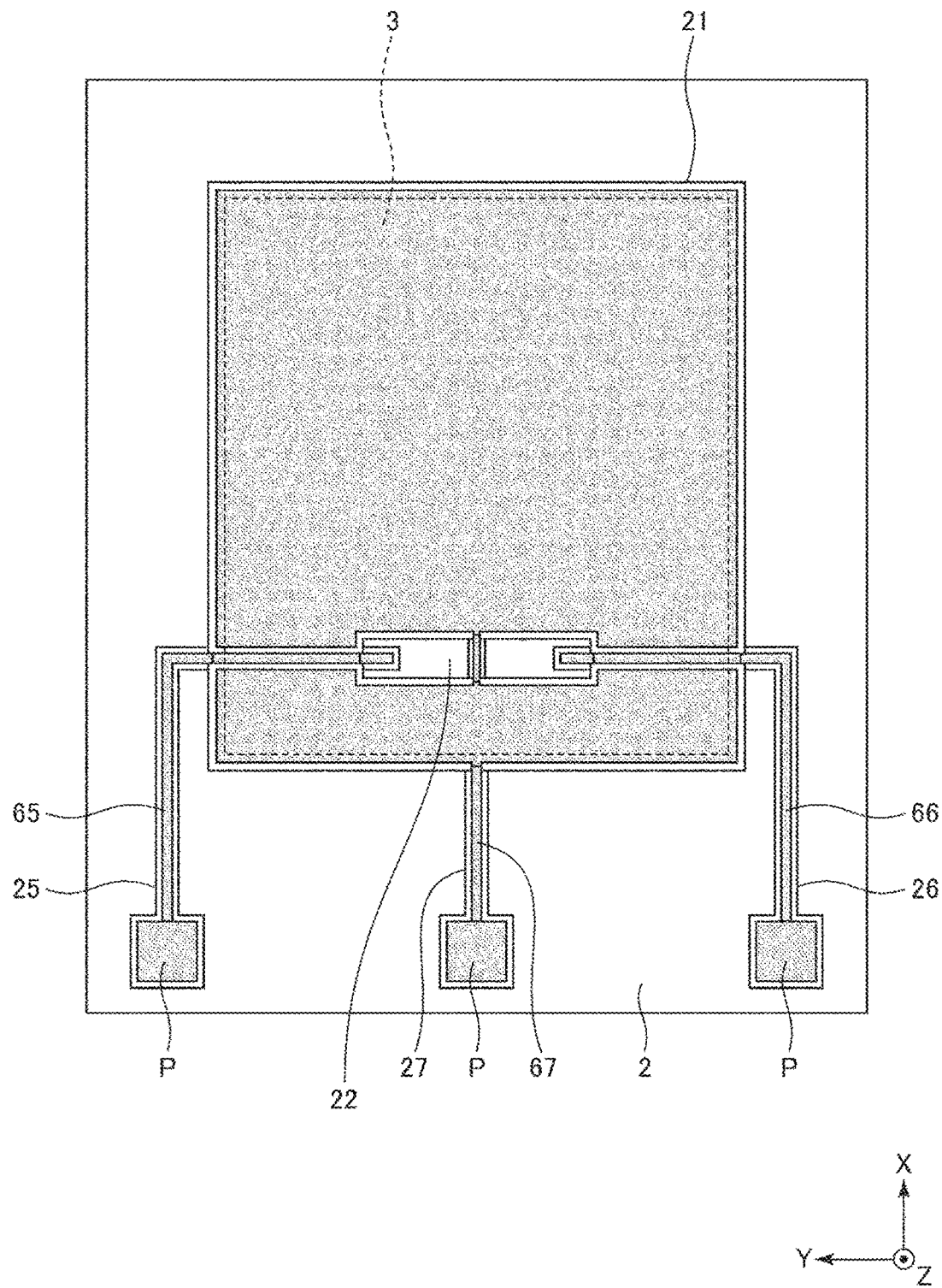
FIG. 21 is a plan view illustrating a conductor pattern included in the physical quantity sensor illustrated in FIG. 19.
Figure 22:
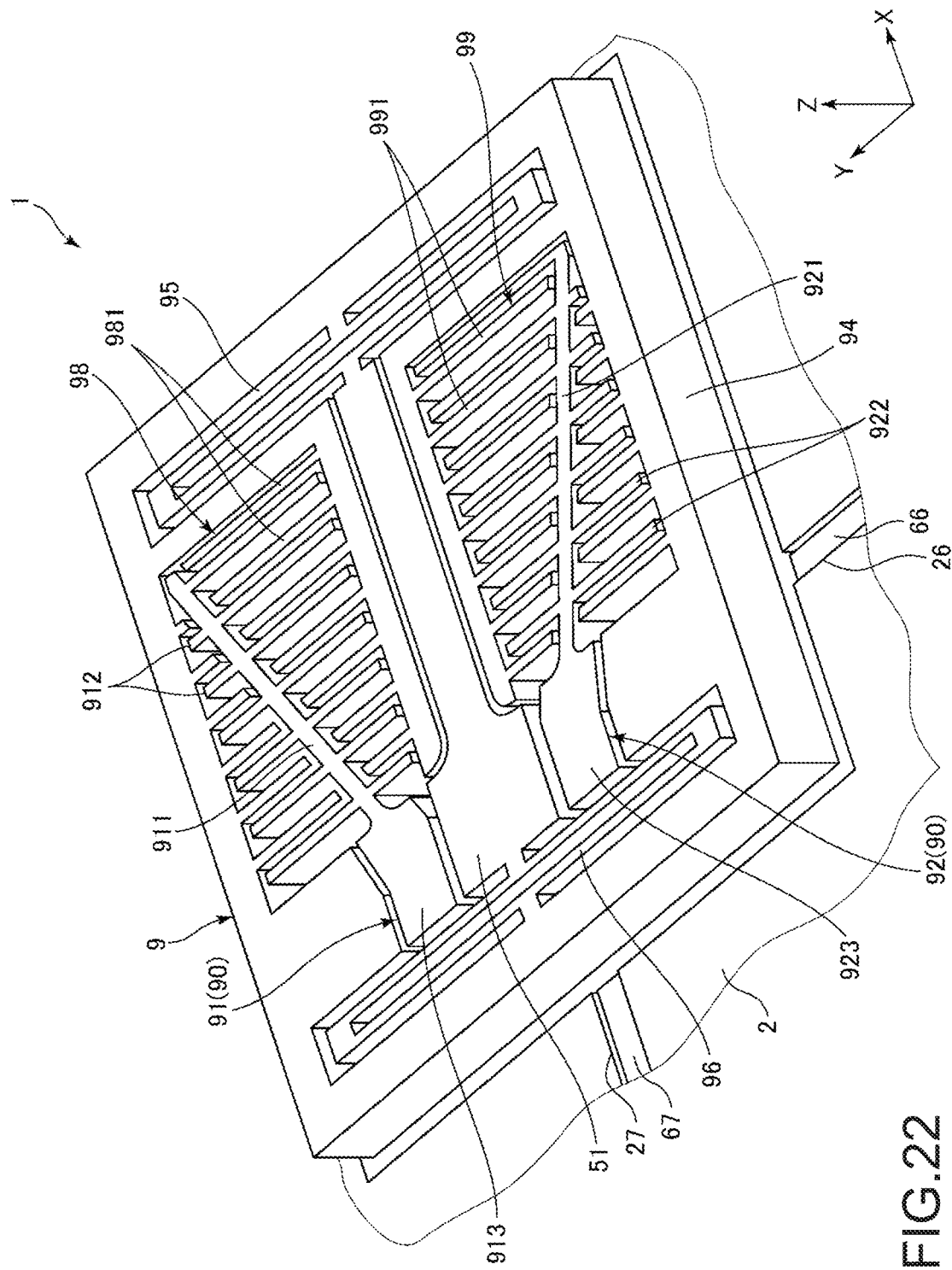
FIG. 22 is a perspective view of an element portion included in the physical quantity sensor illustrated in FIG. 19.
Figure 23:
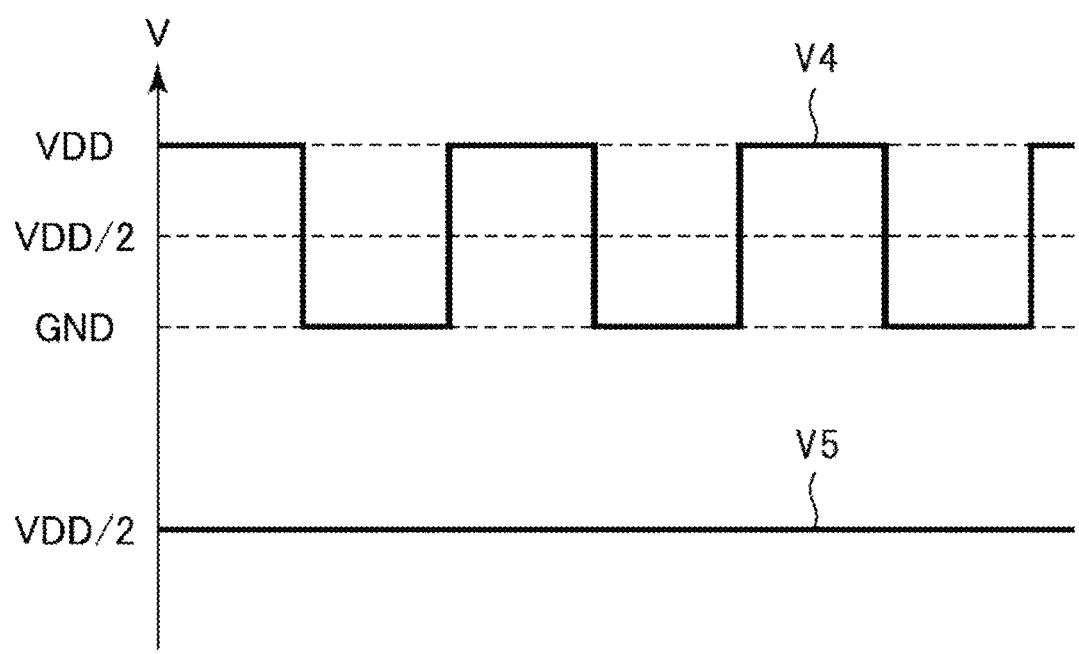
FIG. 23 is a diagram illustrating a voltage pattern to be applied to the physical quantity sensor illustrated in FIG. 19.
Figure 24:
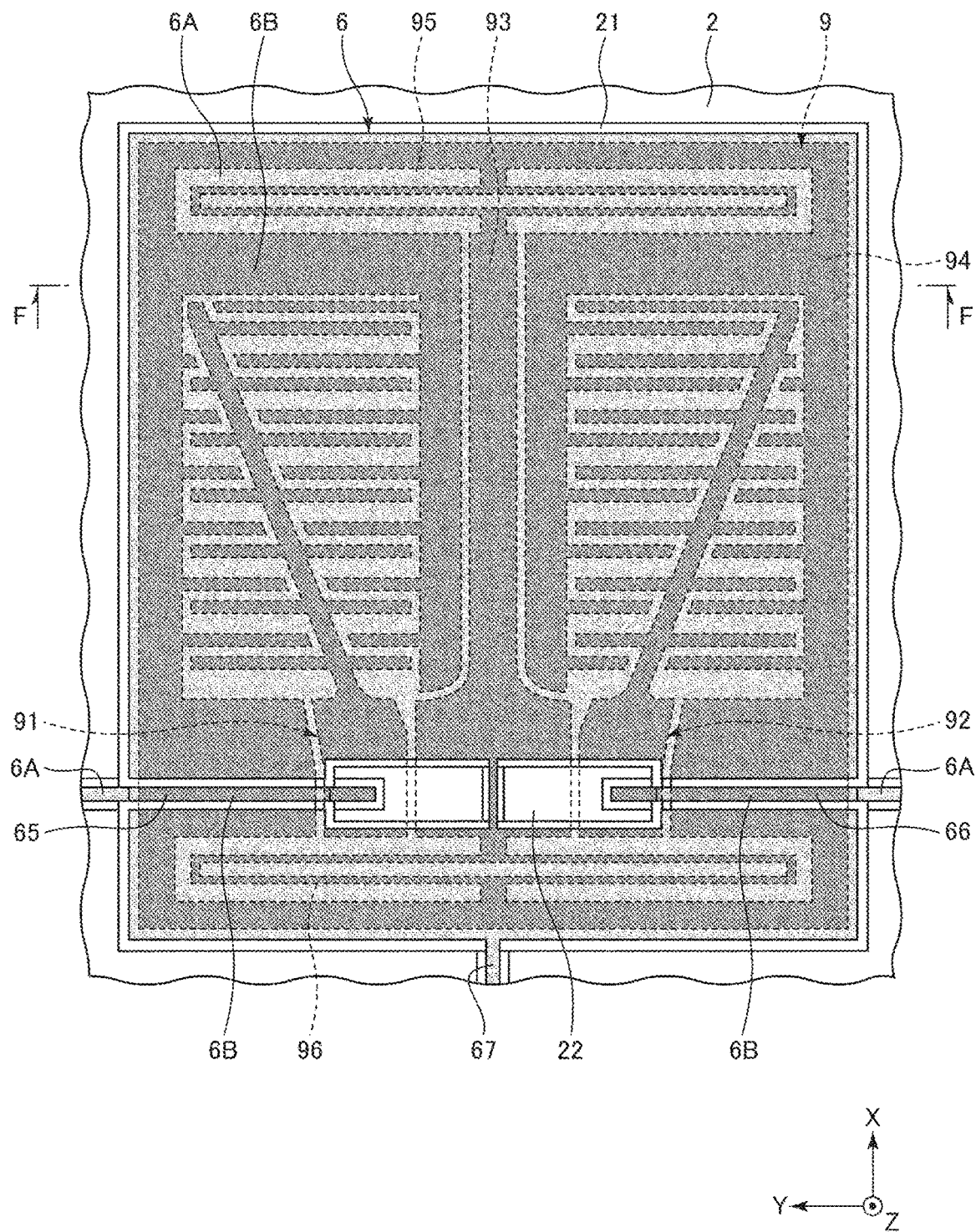
FIG. 24 is a plan view illustrating the conductor pattern included in the physical quantity sensor illustrated in FIG. 19.
Figure 25:
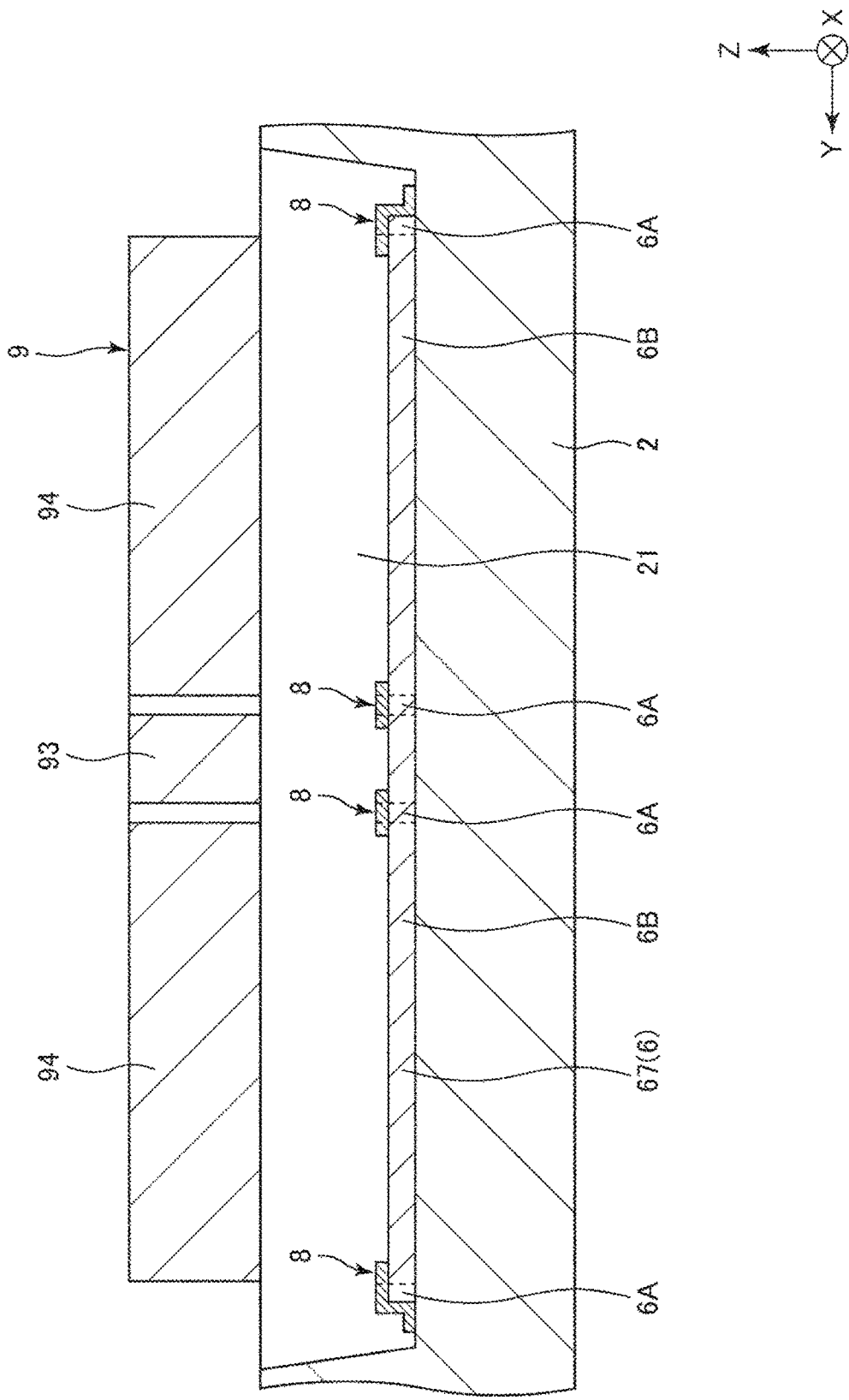
FIG. 25 is a cross-sectional view taken along line F-F in FIG. 24.

FIG. 19 is a plan view illustrating a physical quantity sensor according to a second embodiment. FIG. 20 is a cross-sectional view taken along the line E-E in FIG. 19. FIG. 21 is a plan view illustrating a conductor pattern included in the physical quantity sensor illustrated in FIG. 19. FIG. 22 is a perspective view of an element portion included in the physical quantity sensor illustrated in FIG. 19. FIG. 23 is a diagram illustrating a voltage pattern to be applied to the physical quantity sensor illustrated in FIG. 19. FIG. 24 is a plan view illustrating the conductor pattern included in the physical quantity sensor illustrated in FIG. 19. FIG. 25 is a cross-sectional view taken along line F-F in FIG. 24.

The physical quantity sensor according to the second embodiment is the same as the physical quantity sensor of the first embodiment except that the configuration of the element portion is different.

In the following description, regarding the physical quantity sensor 1 of the second embodiment, description will be mainly made on the differences from the first embodiment described above, and description of similar matters will be omitted. In the following description, the differences between the physical quantity sensor 1 of the second embodiment and the first embodiment will be mainly described, and the description of the same matters will be omitted. In FIGS. 19 to 24, the same reference numerals are given to the same configurations as those of the first embodiment described above. Further, in FIGS. 19 to 22 and 24, illustration of the protection film 8 is omitted for convenience of explanation.

The physical quantity sensor 1 illustrated in FIG. 19 is an acceleration sensor capable of measuring the acceleration Ax in the X-axis direction. As illustrated in FIG. 20, the substrate 2 includes a projection-shaped mount portion 22 provided on the bottom surface of the concave portion 21. An element portion 9 is bonded to the upper surface of the mount portion 22. With this configuration, the element portion 9 is supported in a state of being separated from the substrate 2. As illustrated in FIG. 19, the substrate 2 includes grooves 25, 26, and 27 which open to the upper surface side. The depth of the concave portion 21 is different from and deeper than the depth of the concave portion 21 of the physical quantity sensor 1 of the first embodiment described above.

As illustrated in FIG. 19, the conductor pattern 6 includes wirings 65, 66, and 67 disposed in the grooves 25, 26, and 27. Further, as illustrated in FIGS. 20 and 21, the wirings 65, 66, and 67 are routed along the bottom surface of the concave portion 21 to the top of the mount portion 22, respectively. The wiring 67 is disposed so as to spread over substantially the entire area of the bottom surface of the concave portion 21 while maintaining the state insulated from the wirings 65, 66.

As illustrated in FIGS. 19 and 22, the element portion 9 includes a fixed electrode 90 and a fixed portion 93 fixed to the substrate 2, a movable portion 94 that is displaceable in the X-axis direction with respect to the fixed portion 93, springs 95 and 96 connecting the fixed portion 93 and the movable portion 94, and a movable electrode 97 provided in the movable portion 94. The fixed electrode 90 includes a first fixed electrode 91 and a second fixed electrode 92, and the movable electrode 97 includes a first movable electrode 98 and a second movable electrode 99. Similar to the element portion 3 of the first embodiment described above, such an element portion 9 can be formed, for example, by patterning a silicon substrate doped with impurities such as phosphorus (P), boron (B), arsenic (As) or the like by dry etching (Bosch method).

As illustrated in FIG. 19, the fixed portion 93 has an elongated shape extending in the X-axis direction. The fixed portion 93 includes a bonding portion 931 bonded to the mount portion 22 at an end portion on the minus side in the X-axis direction. Then, the fixed portion 93 is electrically connected to the wiring 67 in the bonding portion 931. The shape of the fixed portion 93 is not particularly limited as long as the fixed portion 93 can exhibit its function.

The movable portion 94 has a frame shape in a plan view from the Z-axis direction, and surrounds the fixed portion 93, the springs 95 and 96, and the first and second fixed electrodes 91 and 92. As such, the movable portion 94 is formed into a frame shape so as to make it possible to increase the mass of the movable portion 94. For that reason, sensitivity is improved, and the acceleration Ax can be detected accurately. The movable portion 94 includes a first opening portion 948 for disposing ng the first fixed electrode 91 on the inner side and a second opening portion 949 for disposing the second fixed electrode 92 on the inner side.

The springs 95 and 96 are elastically deformable, and the movable portion 94 is displaced in the X-axis direction with respect to the fixed portion 93 as the springs 95 and 96 are elastically deformed. The spring 95 connects the end portion on the plus side in the X-axis direction of the movable portion 94 and the end portion on the plus side in the X-axis direction of the fixed portion 93, and the spring 96 connects the end portion on the minus side in the X-axis direction of the movable portion 94 and connects the end portion and the end portion on the minus side in the X-axis direction of the fixed portion 93. With this configuration, the movable portion 94 can be supported on both sides in the X-axis direction, and the attitude and behavior of the movable portion 94 are stabilized. For that reason, unnecessary displacements other than in the X-axis direction are reduced, and the acceleration Ax can be measured with higher accuracy.

The first fixed electrode 91 includes a first fixed portion 913 including a bonding portion 913a bonded to the mount portion 22, a first trunk portion 911 supported by the first fixed portion 913, and a plurality of first fixed electrode fingers 912 extending to both sides in the Y-axis direction from the first trunk portion 911. The first trunk portion 911 extends in a direction inclined with respect to each of the X-axis and the Y-axis in a plan view from the Z-axis direction.

The second fixed electrode 92 includes a second fixed portion 923 including a bonding portion 923a bonded to the mount portion 22, a second trunk portion 921 supported by the second fixed portion 923, and a plurality of second fixed electrode fingers 922 extending to both sides in the Y-axis direction from the second trunk portion 921. The second trunk portion 921 extends in a direction inclined with respect to each of the X-axis and the Y-axis in a plan view from the Z-axis direction.

The first movable electrode 98 includes a plurality of first movable electrode fingers 981 protruding toward the inside of the first opening portion 948 and extending in the Y-axis direction. Each of the first movable electrode fingers 981 is positioned on the plus side in the X-axis direction with respect to the corresponding first fixed electrode finger 912 and faces the first fixed electrode finger 912 with a gap interposed therebetween.

The second movable electrode 99 includes a plurality of second movable electrode fingers 991 protruding toward the inside of the second opening portion 949 and extending in the Y-axis direction. Each of the second movable electrode fingers 991 is positioned on the minus side in the X-axis direction with respect to the corresponding second fixed electrode finger 922 and faces the second fixed electrode finger 922 with a gap interposed therebetween.

When the physical quantity sensor 1 is in operation, for example, the voltage V4 in FIG. 23 is applied to the movable electrode 97, and the voltage V5 in FIG. 23 is applied to each of the first fixed electrode 91 and second fixed electrode 92. For that reason, electrostatic capacitance is formed between the first movable electrode finger 981 and the first fixed electrode finger 912 and between the second movable electrode finger 991 and the second fixed electrode finger 922, respectively.

When the acceleration Ax is applied to the physical quantity sensor 1, the movable portion 94 displaces in the X-axis direction while elastically deforming the springs 95 and 96 based on magnitude of the acceleration Ax. Then, the gap between the first movable electrode finger 981 and the first fixed electrode finger 912 and the gap between the second movable electrode finger 991 and the second fixed electrode finger 922 change, respectively, and accordingly, the magnitude of the electrostatic capacitance between the first movable electrode finger 981 and the first fixed electrode finger 912 and the magnitude of the electrostatic capacitance between the second movable electrode finger 991 and the second fixed electrode finger 922 change, respectively. For that reason, it is possible to measure the acceleration Ax based on change in the electrostatic capacitance.

As illustrated in FIG. 24, the conductor pattern 6 includes the exposed portion 6A exposed from the element portion 9 in a plan view from the Z-axis direction. Then, as illustrated in FIG. 25, the protection film 8 is provided so as to cover the exposed portion 6A. The protection film 8 may cover the entire exposed portion 6A, or may partially cover the exposed portion 6A.

The physical quantity sensor 1 of the second embodiment has been described as above. As described above, in such a physical quantity sensor 1, the element portion 9 includes the first and second fixed electrode fingers 912 and 922 (fixed electrode fingers) fixed to the substrate 2 and the first and second movable electrode fingers 981 and 991 (movable electrode fingers) which are displaceable with respect to the substrate 2 and disposed to face the first and second fixed electrode fingers 912 and 922 with a gap interposed therebetween. The conductor pattern 6 includes the wirings 65 and 66 (first wirings) electrically connected to the first and second fixed electrode fingers 912 and 922, and the wiring 67 (second wiring) electrically connected to the first and second movable electrode fingers 981 and 991. With this configuration, the physical quantity sensor 1 is able to measure the acceleration Ax in the direction (X-axis direction) in which the first and second fixed electrode fingers 912 and 922 and the first and second movable electrode fingers 981 and 991 face each other.

Even with such a second embodiment, it is possible to exhibit the same effects as those of the first embodiment described above.

Third Embodiment

Figure 26:
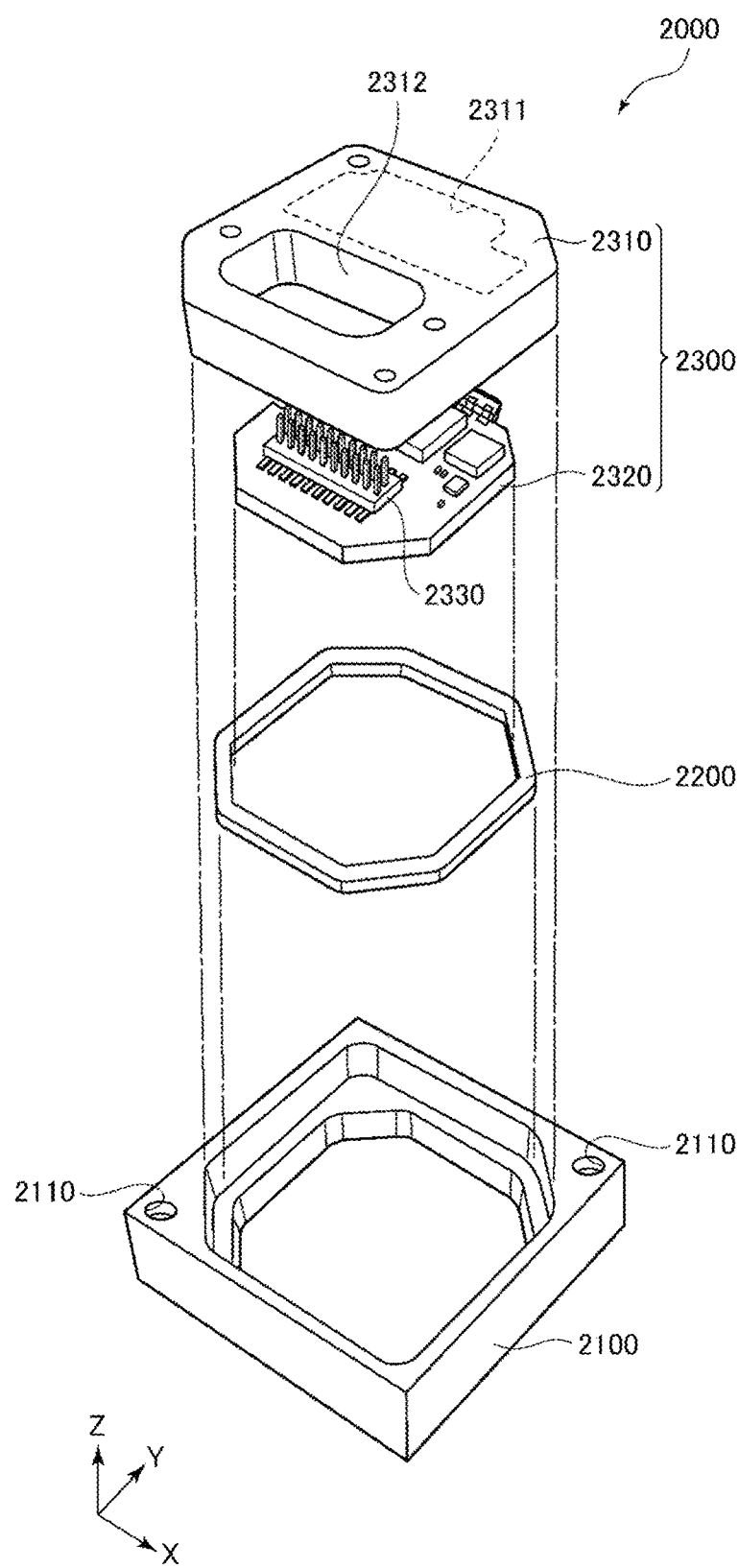
FIG. 26 is an exploded perspective view of an inertia measurement device according to a third embodiment.
Figure 27:
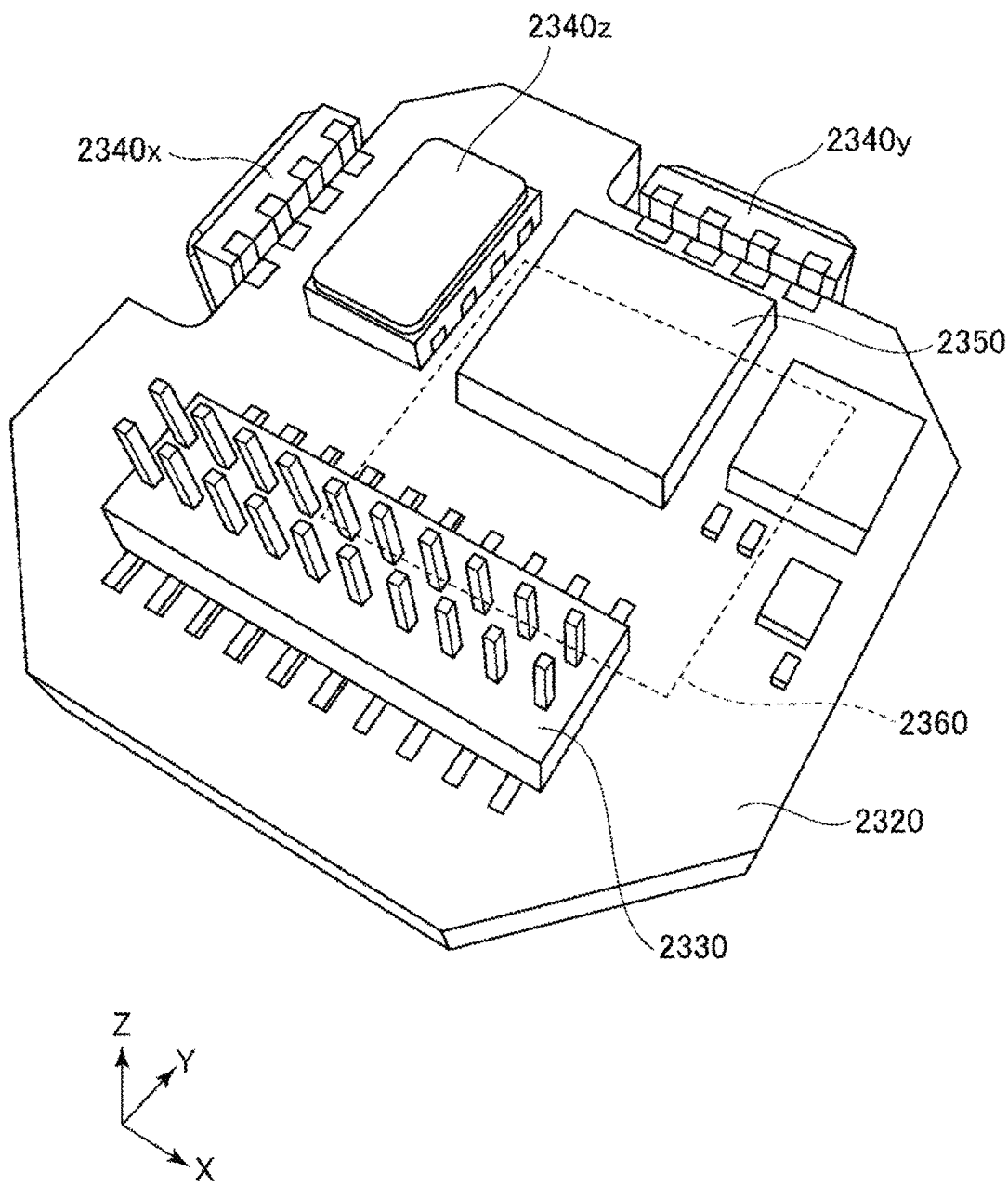
FIG. 27 is a perspective view of a substrate included in the inertia measurement device illustrated in FIG. 26.

Next, an inertia measurement device according to a third embodiment will be described. FIG. 26 is an exploded perspective view of the inertia measurement device according to the third embodiment. FIG. 27 is a perspective view of a substrate included in the inertia measurement device illustrated in FIG. 26.

The inertia measurement device 2000 (IMU: Inertial Measurement Unit) illustrated in FIG. 26 is a device that detects the attitude and behavior (inertial momentum) of a vehicle (mounted device) such as an automobile or a robot. The inertia measurement device 2000 functions as a so-called six-axis motion sensor including three-axis acceleration sensors and three-axis angular velocity sensors.

The inertia measurement device 2000 is a rectangular parallelepiped having a substantially square planar shape. Screw holes 2110 as fixed portions are formed in the vicinity of two vertices positioned in the diagonal direction of the square. Through two screws in the two screw holes 2110, the inertia measurement device 2000 can be fixed to the mounted surface of the mounted object such as an automobile. The size of the inertia measurement device 2000 can be reduced to a size that can be mounted on a smartphone or a digital camera, for example, by selection of parts or design change.

The inertia measurement device 2000 has a configuration in which an outer case 2100, a bonding member 2200, and a sensor module 2300 are included and the sensor module 2300 is inserted in the outer case 2100 with the bonding member 2200 interposed therebetween. Further, the sensor module 2300 includes an inner case 2310 and a substrate 2320.

Similarly to the overall shape of the inertia measurement device 2000, the outer shape of the outer case 2100 is a rectangular parallelepiped having a substantially square planar shape, and screw holes 2110 are formed in the vicinity of two vertices positioned in the diagonal direction of the square. In addition, the outer case 2100 has a box shape and the sensor module 2300 is accommodated therein.

The inner case 2310 is a member for supporting the substrate 2320, and has a shape so as to fit inside the outer case 2100. A concave portion 2311 for preventing contact with the substrate 2320 and an opening 2312 for exposing a connector 2330 described later are formed in the inner case 2310. Such an inner case 2310 is bonded to the outer case 2100 via the bonding member 2200 (for example, a packing impregnated with adhesive). The substrate 2320 is bonded to the lower surface of the inner case 2310 via an adhesive.

As illustrated in FIG. 27, a connector 2330, an angular velocity sensor 2340z for measuring the angular velocity around the Z-axis, an acceleration sensor 2350 for measuring acceleration in each axis directions of the X-axis, the Y-axis, and the Z-axis and the like are mounted on the upper surface of the substrate 2320. An angular velocity sensor 2340x for measuring the angular velocity about the X-axis and an angular velocity sensor 2340y for measuring the angular velocity around the Y-axis are mounted on the side surface of the substrate 2320. The angular velocity sensors 2340z, 2340x, and 2340y are not particularly limited, and for example, a vibration gyro sensor using a Coriolis force can be used. In addition, the acceleration sensor 2350 is not particularly limited, and for example, a capacitance type acceleration sensor can be used.

A control IC 2360 is mounted on the lower surface of the substrate 2320. The control IC 2360 is a micro controller unit (MCU), which includes a storing unit including a nonvolatile memory, an A/D converter, and the like, and controls each unit of the inertia measurement device 2000. In the storing unit, programs defining the order and contents for measuring the acceleration and angular velocity, programs for digitizing detected data and incorporating the detected data into packet data, accompanying data, and the like are stored. A plurality of electronic components are mounted on the substrate 2320 in addition to the control IC 2360.

The inertia measurement device 2000 (inertia measurement device) has been described as above. Such an inertia measurement device 2000 includes angular velocity sensors 2340z, 2340x, and 2340y and the acceleration sensor 2350 as the physical quantity sensor, a control circuit for controlling driving of each of the angular velocity sensor sensors 2340z, 2340x, and 2340y, and an output signal from the acceleration sensor 2350 and a control IC 2360 (control circuit) including a processing circuit for processing the output signal of the acceleration sensor 2350. With this configuration, the effect of the physical quantity sensor can be obtained, and the inertia measurement device 2000 with high reliability can be obtained.

Fourth Embodiment

Next, a vehicle positioning device according to a fourth embodiment will be described.

Figure 28:
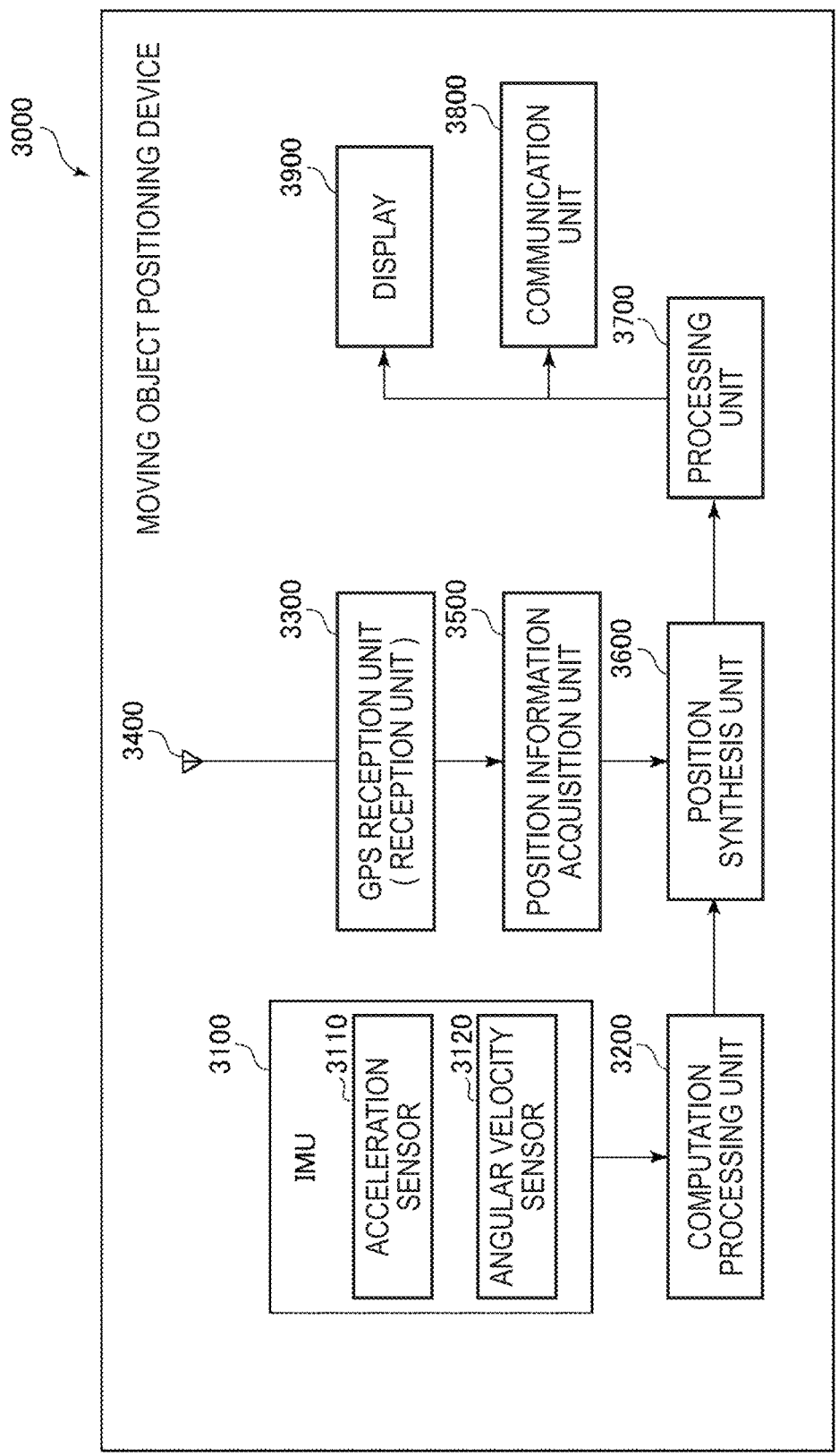
FIG. 28 is a block diagram illustrating an overall system of a vehicle positioning device according to a fourth embodiment.
Figure 29:
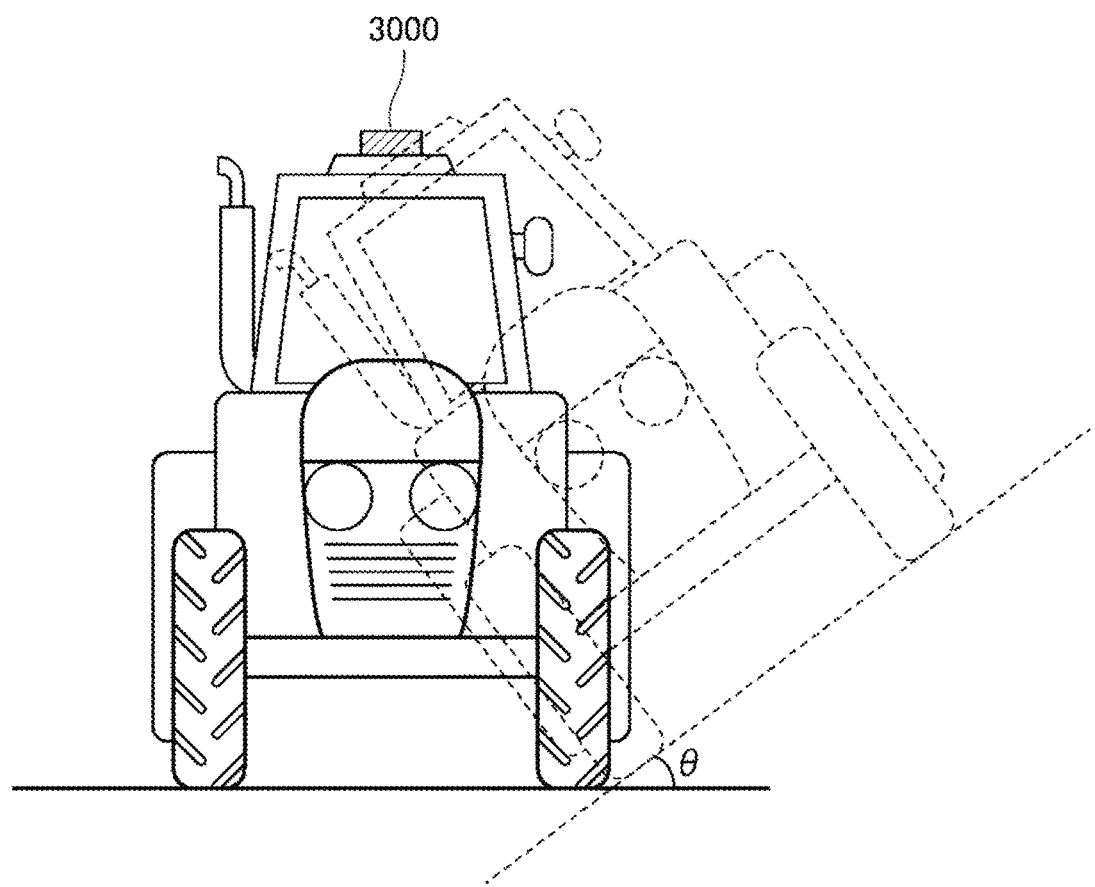
FIG. 29 is a diagram illustrating the operation of the vehicle positioning device illustrated in FIG. 28.

FIG. 28 is a block diagram illustrating the entire system of the vehicle positioning device according to the fourth embodiment. FIG. 29 is a diagram illustrating the operation of the vehicle positioning device illustrated in FIG. 28.

A vehicle positioning device 3000 illustrated in FIG. 28 is a device which is used by being mounted on a vehicle and performs positioning of the vehicle. The vehicle is not particularly limited, and may be any of a bicycle, an automobile (including a four-wheeled automobile and a motorcycle), a train, an airplane, a ship, and the like, but in the fourth embodiment, the vehicle is described as a four-wheeled automobile. The vehicle positioning device 3000 includes an inertia measurement device 3100 (IMU), a computation processing unit 3200, a GPS reception unit 3300, a receiving antenna 3400, a position information acquisition unit 3500, a position synthesis unit 3600, a processing unit 3700, a communication unit 3800, and a display 3900. As the inertia measurement device 3100, for example, the inertia measurement device 2000 of the third embodiment described above can be used.

The inertia measurement device 3100 includes a tri-axis acceleration sensor 3110 and a tri-axis angular velocity sensor 3120. The computation processing unit 3200 receives acceleration data from the acceleration sensor 3110 and angular velocity data from the angular velocity sensor 3120, performs inertial navigation computation processing on these data, and outputs inertial navigation positioning data (data including acceleration and attitude of the vehicle).

The GPS reception unit 3300 receives a signal (GPS carrier wave, satellite signal on which position information is superimposed) from the GPS satellite via the receiving antenna 3400. Further, the position information acquisition unit 3500 outputs GPS positioning data representing the position (latitude, longitude, altitude), speed, direction of the vehicle positioning device 3000 (vehicle) based on the signal received by the GPS reception unit 3300. The GPS positioning data also includes status data indicating a reception state, a reception time, and the like.

Based on inertial navigation positioning data output from the computation processing unit 3200 and the GPS positioning data output from the position information acquisition unit 3500, the position synthesis unit 3600 calculates the position of the vehicle, more specifically, the position on the ground where the vehicle is traveling. For example, even if the position of the vehicle included in the GPS positioning data is the same, as illustrated in FIG. 29, if the attitude of the vehicle is different due to the influence of inclination of the ground or the like, the vehicle is traveling at different positions on the ground. For that reason, it is impossible to calculate an accurate position of the vehicle with only GPS positioning data. Therefore, the position synthesis unit 3600 calculates the position on the ground where the vehicle is traveling, using inertial navigation positioning data (in particular, data on the attitude of the vehicle). This determination can be made comparatively easily by computation using a trigonometric function (inclination $\theta$ with respect to the vertical direction).

The position data output from the position synthesis unit 3600 is subjected to predetermined processing by the processing unit 3700 and displayed on the display 3900 as a positioning result. Further, the position data may be transmitted to the external device by the communication unit 3800.

The vehicle positioning device 3000 has been described as above. As described above, such a vehicle positioning device 3000 includes the inertia measurement device 3100, the GPS reception unit 3300 (reception unit) that receives a satellite signal on which position information is superimposed from a positioning satellite, the position information acquisition unit 3500 (acquisition unit) that acquires position information of the GPS reception unit 3300 based on the received satellite signal, the computation processing unit 3200 (computation unit) that computes the attitude of the vehicle based on the inertial navigation positioning data (inertia data) output from the inertia measurement device 3100, and the position synthesis unit 3600 (calculation unit) that calculates the position of the vehicle by correcting position information based on the calculated attitude. With this configuration, the effect of the inertia measurement device can be achieved, and the vehicle positioning device 3000 with high reliability can be obtained.

Fifth Embodiment

Figure 30:
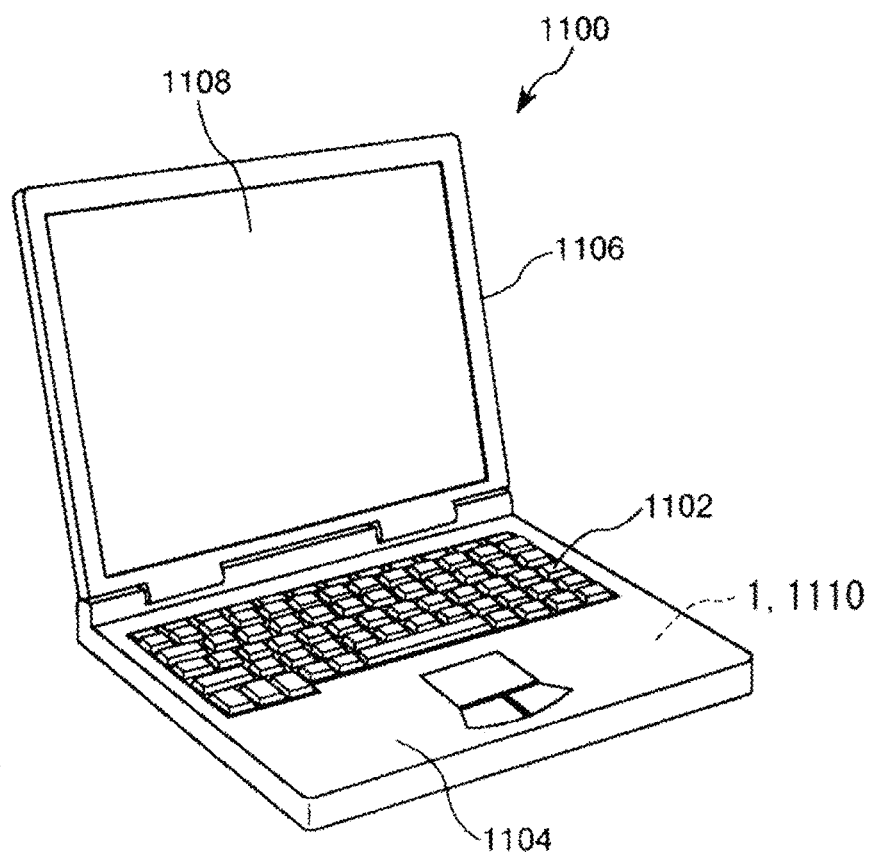
FIG. 30 is a perspective view illustrating an electronic apparatus according to a fifth embodiment.

Next, an electronic apparatus according to a fifth embodiment will be described. FIG. 30 is a perspective view illustrating an electronic apparatus according to a fifth embodiment.

The mobile type (or notebook type) personal computer 1100 illustrated in FIG. 30 is a personal computer to which the electronic apparatus according to the invention is applied. In FIG. 30, the personal computer 1100 is constituted with a main body 1104 including a keyboard 1102 and a display unit 1106 including a display 1108, and the display unit 1106 is supported so as to be rotatable with respect to the main body 1104 via a hinge structure. In such a personal computer 1100, the physical quantity sensor 1 and a control circuit 1110 (control unit) that performs control based on detection signals output from the physical quantity sensor 1 are built in.

Such a personal computer 1100 (electronic apparatus) includes the physical quantity sensor 1, and the control circuit 1110 (control unit) that performs control based on the detection signals output from the physical quantity sensor 1. For that reason, the effect of the physical quantity sensor 1 described above can be obtained, and high reliability can be exhibited.

Sixth Embodiment

Next, an electronic apparatus according to a sixth embodiment will be described.

Figure 31:
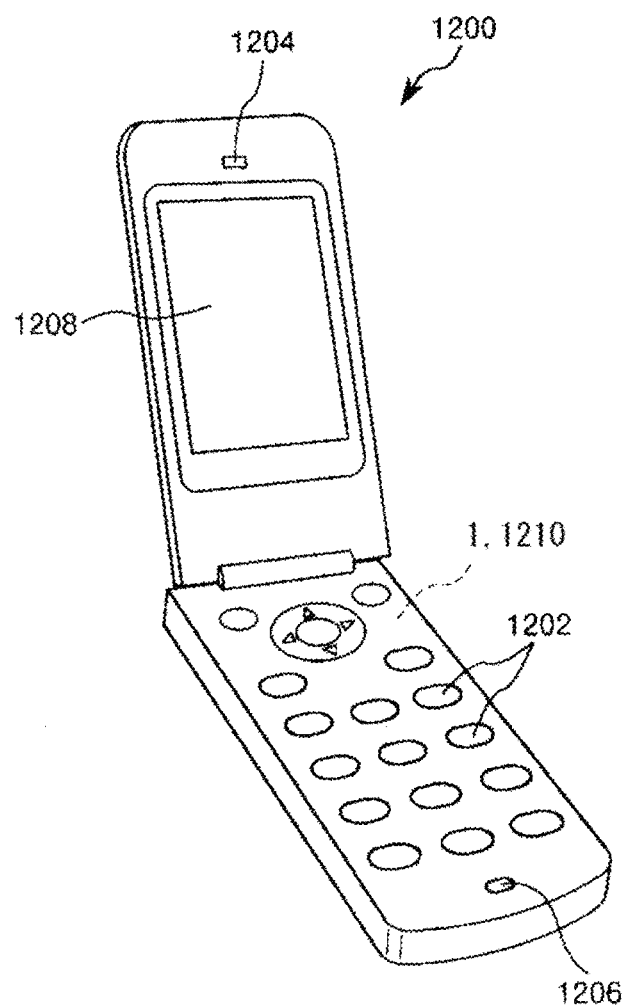
FIG. 31 is a perspective view illustrating an electronic apparatus according to a sixth embodiment.

FIG. 31 is a perspective view illustrating an electronic apparatus according to a sixth embodiment.

The mobile phone 1200 (including PHS) illustrated in FIG. 31 is a mobile phone to which the electronic apparatus according to the invention is applied. In FIG. 31, the mobile phone 1200 includes an antenna (not illustrated), a plurality of operation buttons 1202, an earpiece 1204, and a mouthpiece 1206, and a display 1208 is disposed between the operation button 1202 and the earpiece 1204. In such a mobile phone 1200, the physical quantity sensor 1 and a control circuit 1210 (control unit) that performs control based on the detection signals output from the physical quantity sensor 1, are built in.

Such a mobile phone 1200 (electronic apparatus) includes the physical quantity sensor 1 and the control circuit 1210 (control unit) that performs control based on the detection signals output from the physical quantity sensor 1. For that reason, the effect of the physical quantity sensor 1 described above can be obtained, and high reliability can be exhibited.

Seventh Embodiment

Next, an electronic apparatus according to a seventh embodiment will be described.

Figure 32:
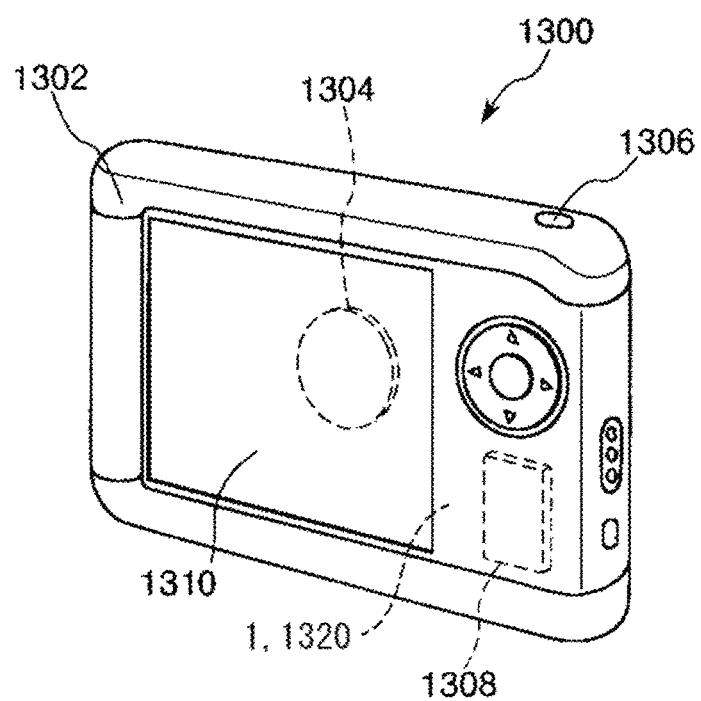
FIG. 32 is a perspective view illustrating an electronic apparatus according to a seventh embodiment.

FIG. 32 is a perspective view illustrating an electronic apparatus according to a seventh embodiment.

A digital still camera 1300 illustrated in FIG. 32 is a digital still camera to which the electronic apparatus according to the invention is applied. In FIG. 32, a display 1310 is provided on the rear surface of a case 1302, and the display 1310 is configured to perform display based on an imaging signal from the CCD, and the display 1310 functions as a viewfinder for displaying a subject as an electronic image. A light reception unit 1304 including an optical lens (imaging optical system) and a CCD or the like is provided on the front side (back side in the figure) of the case 1302. When a photographer confirms a subject image displayed on the display 1310 and presses a shutter button 1306, the imaging signal of the CCD at that time is transferred to and stored in the memory 1308. In such a digital still camera 1300, the physical quantity sensor 1 and a control circuit 1320 (control unit) that performs control based on detection signals output from the physical quantity sensor 1 are built in.

Such a digital still camera 1300 (electronic apparatus) includes the physical quantity sensor 1 and the control circuit 1320 (control unit) that performs control based on detection signals output from the physical quantity sensor 1. For that reason, the effect of the physical quantity sensor 1 described above can be obtained, and high reliability can be exhibited.

In addition to the personal computer and mobile phone of the embodiments described above and the digital still camera of the seventh embodiment, the electronic apparatus of the seventh embodiment can be applied to, for example, a smartphone, a tablet terminal, a clock (including smart watch), an ink jet type discharging device (for example, an ink jet printer), a laptop personal computer, a TV, a wearable terminals such as HMD (head mounted display), a video camera, a video tape recorder, a car navigation device, a pager, an electronic diary (including with communication function), an electronic dictionary, a calculator, an electronic game machines, a word processor, a work station, a videophone, a security TV monitor, an electronic binoculars, a POS terminal, medical equipment (for example, electronic clinical thermometer, blood pressure monitor, blood glucose meter, electrocardiogram measurement device, ultrasonic diagnostic device, electronic endoscope), a fish finder, various measuring instruments, mobile terminal base station equipment, instruments (for example, instruments of vehicles, aircraft, ships), a flight simulator, a network server, and the like.

Eighth Embodiment

Next, a portable electronic apparatus according to an eighth embodiment will be described.

Figure 33:
FIG. 33 is a plan view illustrating a portable electronic apparatus according to an eighth embodiment.

FIG. 33 is a plan view illustrating a portable electronic apparatus according to an eighth embodiment.

Figure 34:
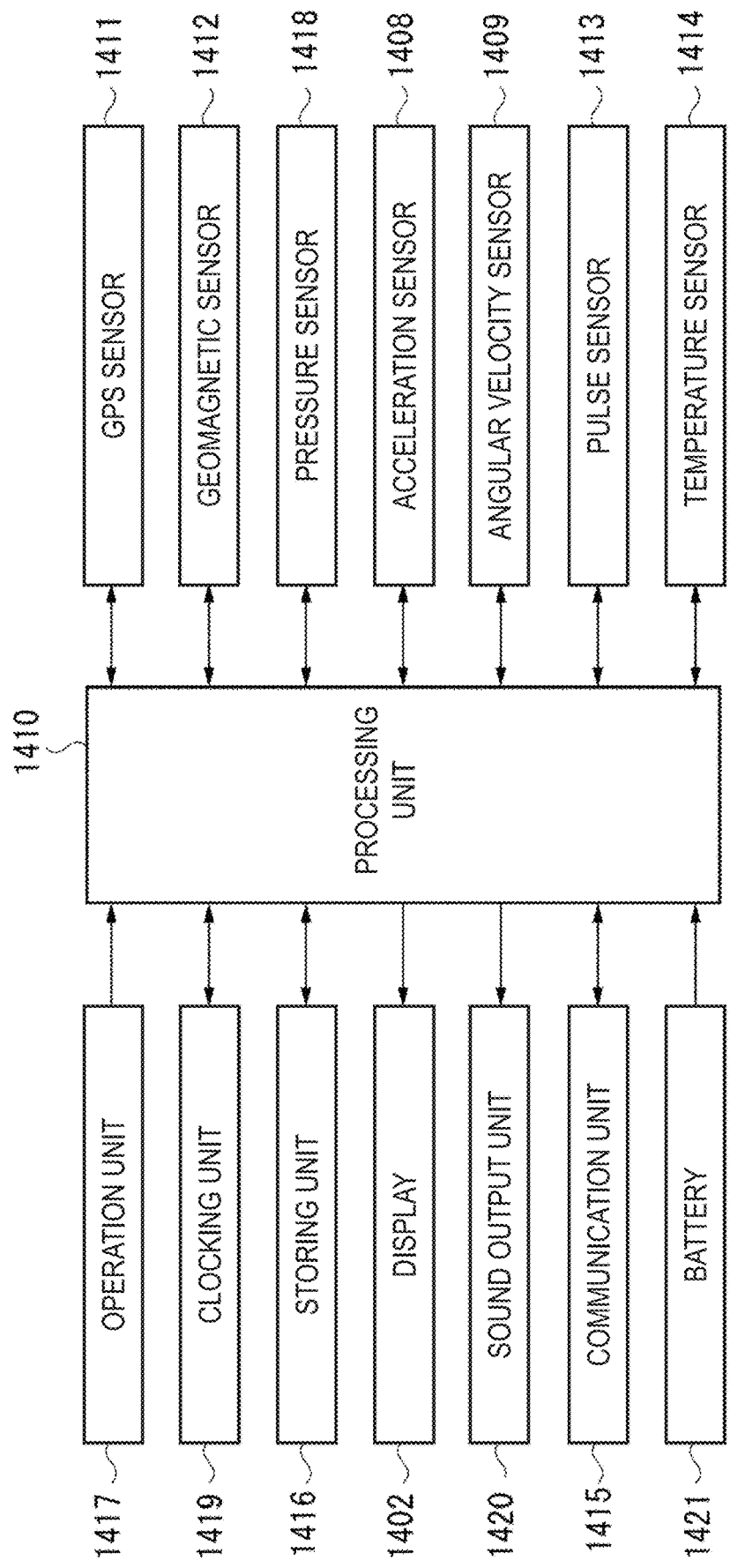
FIG. 34 is a functional block diagram illustrating a schematic configuration of the portable electronic apparatus illustrated in FIG. 33.

FIG. 34 is a functional block diagram illustrating a schematic configuration of the portable electronic apparatus illustrated in FIG. 33.

A watch type activity meter 1400 (active tracker) illustrated in FIG. 33 is a wristwatch device to which the portable electronic apparatus according to the invention is applied. The activity meter 1400 is attached to a part (subject) such as the user's wristwatch by a band 1401. The activity meter 1400 includes a display 1402 for digital display and can perform wireless communication. The physical quantity sensor 1 described above is incorporated in the activity meter 1400 as a sensor for measuring acceleration and a sensor for measuring angular velocity.

The activity meter 1400 includes a case 1403 accommodating the physical quantity sensor 1, a processing unit 1410 which is accommodated in the case 1403 and is for processing output data from the physical quantity sensor 1, the display 1402 accommodated in the case 1403, and a translucent cover 1404 covering the opening of the case 1403. A bezel 1405 is provided outside the translucent cover 1404. A plurality of operation buttons 1406 and 1407 are provided on the side surface of the case 1403.

As illustrated in FIG. 34, the acceleration sensor 1408 serving as the physical quantity sensor 1 measures acceleration in each of the three axis directions which intersect (ideally orthogonal to) each other, and outputs a signal (acceleration signal) according to the magnitude and direction of the detected three-axis acceleration. An angular velocity sensor 1409 measures angular velocity in each of the three axis directions intersecting (ideally orthogonal to) each other, and outputs a signal (angular velocity signal) according to the magnitude and direction of the detected three-axis angular velocity.

In the liquid crystal display (LCD) constituting the display 1402, depending on various detection modes, for example, position information using a GPS sensor 1411 and a geomagnetic sensor 1412, exercise information such as the amount of exercise using the acceleration sensor 1408 and the angular velocity sensor 1409 included in the physical quantity sensor 1, biometric information such as a pulse rate using a pulse sensor 1413 or the like, and time information such as current time, and the like are displayed. The environmental temperature using a temperature sensor 1414 can also be displayed.

A communication unit 1415 performs various controls for establishing communication between a user terminal and an information terminal (not illustrated). The communication unit 1415 is configure to include a transceiver compatible with the short range wireless communication standard such as, for example, a Bluetooth (registered trademark) (including BTLE: Bluetooth Low Energy), Wireless Fidelity (Wi-Fi) (registered trademark), Zigbee (registered trademark), near field communication (NFC), ANT+ (registered trademark) or the like, and a connector compatible with a communication bus standard such as the universal serial bus (USB) or the like.

The processing unit 1410 (processor) is constituted by, for example, a micro processing unit (MPU), a digital signal processor (DSP), an application specific integrated circuit (ASIC), or the like. The processing unit 1410 executes various processing based on the program stored in a storing unit 1416 and a signal input from an operation unit 1417 (for example, operation buttons 1406 and 1407). Processing by the processing unit 1410 includes data processing for each output signal of the GPS sensor 1411, the geomagnetic sensor 1412, a pressure sensor 1418, the acceleration sensor 1408, the angular velocity sensor 1409, the pulse sensor 1413, the temperature sensor 1414, and the clocking unit 1419, display processing for causing the display 1402 to display an image, sound output processing for causing a sound output unit 1420 to output sound, communication processing for performing communication with the information terminal via the communication unit 1415, and Power control processing for supplying power from a battery 1421 to each unit, and the like.

Such an activity meter 1400 can have at least the following functions.

1. Distance: Measure the total distance from the start of measurement with highly accurate GPS function.

2. Pace: Display a current running pace from pace distance measurement.

3. Average speed: Calculate an average speed and display the average speed from the start of running to the present.

4. Altitude: Measure and display altitude with GPS function.

5. Stride: Measure and display the stride even in a tunnel where GPS radio waves do not reach.

6. Pitch: Measure and display the number of steps per minute.

7. Heart rate: The heart rate is measured and displayed by the pulse sensor.

8. Gradient: Measure and display the gradient of the ground in training and trail runs in the mountains.

9. Auto lap: Automatically perform lap measurement when running for a fixed distance set in advance or for a fixed time.

10. Exercise consumption calorie: Display calorie consumption.

11. Step count: Display the total number of steps from the start.

Such an activity meter 1400 (portable electronic apparatus) includes the physical quantity sensor 1, the case 1403 accommodating the physical quantity sensor 1, the processing unit 1410 which is accommodated in the case 1403 and performs processing output data from the physical quantity sensor 1, the display 1402 accommodated in the case 1403, and the translucent cover 1404 covering the opening portion of the case 1403. For that reason, the effect of the physical quantity sensor 1 described above can be achieved and high reliability can be exhibited.

The activity meter 1400 can be widely applied to a running watch, a runner's watch, a runner's watch for multiple sports such as duathlon and triathlon, an outdoor watch, and a GPS watch equipped with a satellite positioning system such as the GPS.

In the above description, although description is made by using the global positioning system (GPS) as a satellite positioning system, other global navigation satellite system (GNSS) may be used. For example, one or more of satellite positioning systems among satellite positioning systems such as European geostationary-satellite navigation overlay service (EGNOS), quasi zenith satellite system (QZSS), global navigation satellite system (GLONASS), GALILEO, Beidou navigation satellite system (Bei Dou) may be used. Also, a stationary satellite type satellite-based augmentation system (SBAS) such as wide area augmentation system (WAAS) or European geostationary-satellite navigation overlay service (EGNOS) may be utilized in at least one of the satellite positioning systems.

Ninth Embodiment

Next, a vehicle according to a ninth embodiment will be described.

Figure 35:
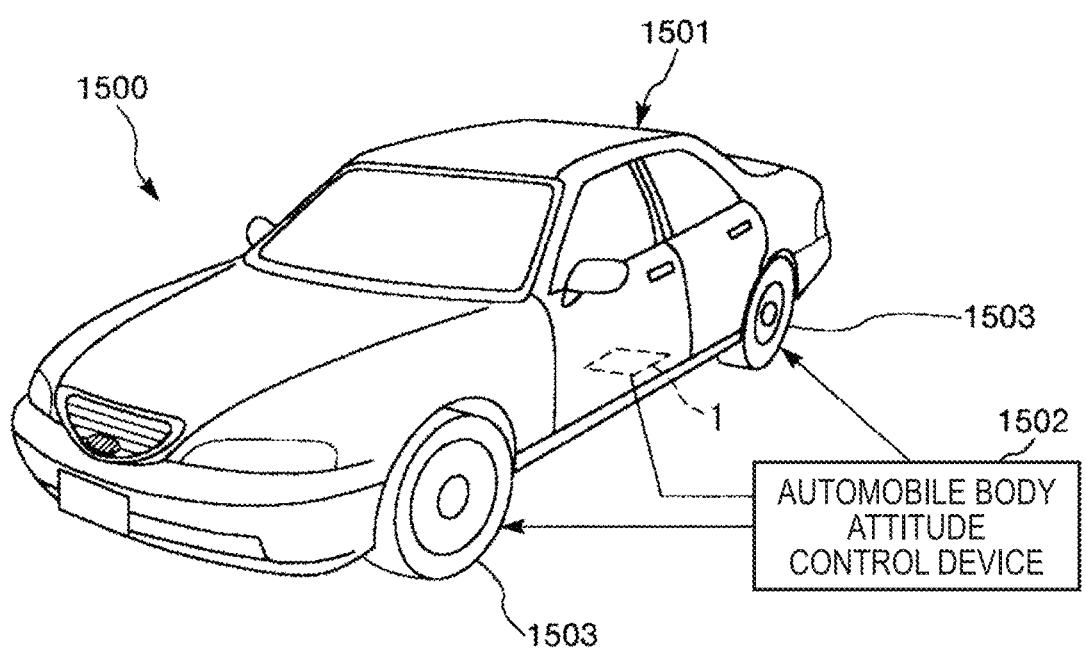
FIG. 35 is a perspective view illustrating a vehicle according to a ninth embodiment.

FIG. 35 is a perspective view illustrating a vehicle according to a ninth embodiment.

An automobile 1500 illustrated in FIG. 35 is an automobile to which the vehicle of the embodiment is applied. In FIG. 35, the automobile 1500 includes a built-in physical quantity sensor 1, and the attitude of the automobile body 1501 can be detected by the physical quantity sensor 1. The detection signal of the physical quantity sensor 1 is supplied to an automobile body attitude control device 1502 (attitude control unit), and the automobile body attitude control device 1502 detects the attitude of the automobile body 1501 based on the signal, and can control hardness of the suspension or can control the brakes of individual wheels 1503 according to the measured result.

Such an automobile 1500 (vehicle) includes the physical quantity sensor 1 and the automobile body attitude control device 1502 (control unit) that performs control based on the detection signal output from the physical quantity sensor 1. For that reason, the effect of the physical quantity sensor 1 described above can be achieved and high reliability can be exhibited.

The physical quantity sensor 1 can also be widely applied to a car navigation system, a car air conditioner, an anti-lock braking system (ABS), an air bag, a tire pressure monitoring system (TPMS), an engine control, and an electronic control unit (ECU) such as a battery monitor of a hybrid car or an electric automobile.

Also, the vehicle is not limited to the automobile 1500, but can also be applied to airplane, rocket, artificial satellite, ship, automated guided vehicle (AGV), biped walking robot, unmanned airplanes such as drone, and the like.

Although the physical quantity sensor, the inertia measurement device, the vehicle positioning device, the portable electronic apparatus, the electronic apparatus, and the vehicle according to the invention have been described based on the illustrated embodiments, the invention is not limited thereto. The configuration of each unit can be replaced with any configuration having the same function. In addition, any other constituent element may be added to the invention. Further, the embodiments described above may be appropriately combined.

Further, in the embodiments described above, the configuration in which the physical quantity sensor detects the acceleration has been described. However, the physical quantity detected by the physical quantity sensor is not particularly limited, and may be, for example, an angular velocity, a pressure, or the like. The physical quantity sensor may be configured to be able to detect a plurality of physical quantities. The plurality of physical quantities are physical quantities (for example, acceleration in the X-axis direction, acceleration in the Y-axis direction, and acceleration in the Z axis direction, angular velocity about the X-axis, angular velocity around the Y-axis, and angular velocity around the Z-axis) of the same kind having different detection axes, or may be a different physical quantity (for example, angular velocity about the X-axis and an acceleration in the X-axis direction).

What is claimed is:

1. A physical quantity sensor comprising:
a substrate;
an element portion overlapping the substrate;
a conductor pattern disposed directly on the substrate and including a central region opposed to and facing the element portion; and
a protection film covering at least a part of an exposed portion of the conductor pattern exposed from the element portion in a plan view from a direction in which the substrate and the element portion overlap,
wherein the element portion includes
a movable portion including a first mass portion and a second mass portion,
a fixed portion attached to the substrate, and
a beam connecting the movable portion and the fixed portion with each other, and
the conductor pattern includes
a first fixed electrode disposed to face the first mass portion, and
a second fixed electrode disposed to face the second mass portion.

2. The physical quantity sensor according to claim 1, wherein a through-hole is formed in the movable portion.

3. The physical quantity sensor according to claim 1, wherein at least a part of a portion of the first fixed electrode facing the first mass portion is exposed from the protection film, and
at least a part of a portion of the second fixed electrode facing the second mass portion is exposed from the protection film.

4. The physical quantity sensor according to claim 1, wherein the conductor pattern includes a wiring, and
a thickness of the protection film provided on the wiring is thicker than a thickness of the protection film disposed on each of the first fixed electrode and the second fixed electrode.

5. A physical quantity sensor comprising:
a substrate;
an element portion overlapping the substrate;
a conductor pattern disposed directly on the substrate and including a central region opposed to and facing the element portion; and
a protection film covering at least a part of an exposed portion of the conductor pattern exposed from the element portion in a plan view from a direction in which the substrate and the element portion overlap,
wherein the element portion includes
a fixed electrode finger fixed to the substrate, and
a movable electrode finger which is displaceable with respect to the substrate and is disposed to face the fixed electrode finger with a gap interposed therebetween, and
the conductor pattern includes
a first wiring electrically connected to the fixed electrode finger, and
a second wiring electrically connected to the movable electrode finger.

6. The physical quantity sensor according to claim 5, wherein the conductor pattern includes a first portion and a second portion that are arranged side by side,
at least one of the first portion and the second portion includes the exposed portion at an outer edge portion on a side of the other of the first portion and the second portion,
a distance between the first portion and the second portion is 50 μm or less, and
at least a part of the exposed portion is covered with the protection film.

7. The physical quantity sensor according to claim 5, wherein the conductor pattern includes a first portion and a second portion that are arranged side by side,
at least one of the first portion and the second portion includes the exposed portion at an outer edge portion on a side of the other of the first portion and the second portion,
a distance between the first portion and the second portion is greater than 50 μm, and
at least a part of the exposed portion is covered with the protection film.

8. The physical quantity sensor according to claim 5, wherein the protection film contains silicon oxide as a constituent material.

9. The physical quantity sensor according to claim 5, wherein the protection film is constituted by a laminated body formed by laminating a plurality of layers.

10. An inertia measurement device comprising:
the physical quantity sensor according to claim 5, and
a control circuit that controls driving of the physical quantity sensor or a processing circuit that processes an output signal of the physical quantity sensor.

11. An electronic apparatus comprising:
the physical quantity sensor according to claim 5; and
a control unit that performs control based on a detection signal output from the physical quantity sensor.

12. A vehicle comprising:
the physical quantity sensor according to claim 5; and
a control unit that performs control based on a detection signal output from the physical quantity sensor.

13. The physical quantity sensor according to claim 1,
wherein the conductor pattern includes a first portion and a second portion that are arranged side by side,
at least one of the first portion and the second portion includes the exposed portion at an outer edge portion on a side of the other of the first portion and the second portion,
a distance between the first portion and the second portion is 50 μm or less, and
at least a part of the exposed portion is covered with the protection film.

14. The physical quantity sensor according to claim 1,
wherein the conductor pattern includes a first portion and a second portion that are arranged side by side,
at least one of the first portion and the second portion includes the exposed portion at an outer edge portion on a side of the other of the first portion and the second portion,
a distance between the first portion and the second portion is greater than 50 μm, and
at least a part of the exposed portion is covered with the protection film.

15. The physical quantity sensor according to claim 1,
wherein the protection film contains silicon oxide as a constituent material.

16. The physical quantity sensor according to claim 1,
wherein the protection film is constituted by a laminated body formed by laminating a plurality of layers.

17. An inertia measurement device comprising:
the physical quantity sensor according to claim 1; and
a control circuit that controls driving of the physical quantity sensor or a processing circuit that processes an output signal of the physical quantity sensor.

18. A vehicle positioning device comprising:
the inertia measurement device according to claim 17;
a reception unit that receives a satellite signal on which position information is superimposed from a positioning satellite;
an acquisition unit that acquires position information of the reception unit based on the received satellite signal;
a computation unit that computes an attitude of the vehicle based on inertia data output from the inertia measurement device; and
a calculation unit that calculates a position of the vehicle by correcting the position information based on the calculated attitude.

19. An electronic apparatus comprising:
the physical quantity sensor according to claim 1; and
a control unit that performs control based on a detection signal output from the physical quantity sensor.

20. A vehicle comprising:
the physical quantity sensor according to claim 1; and
a control unit that performs control based on a detection signal output from the physical quantity sensor.

* * * * *